(12) United States Patent (10) Patent No.: US 9,049,048 B2
Hyoudou (45) Date of Patent: Jun. 2, 2015

(54) RECORDING MEDIUM HAVING COMMUNICATION PROGRAM RECORDED THEREIN, RELAY NODE AND COMMUNICATION METHOD

(75) Inventor: Kazuki Hyoudou, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1173 days.

(21) Appl. No.: 12/723,751

(22) Filed: Mar. 15, 2010

(65) Prior Publication Data

US 2010/0232319 A1    Sep. 16, 2010

(30) Foreign Application Priority Data

Mar. 16, 2009   (JP) .................................. 2009-63492

(51) Int. Cl.
*H04L 12/46*        (2006.01)
*H04L 12/701*       (2013.01)
*H04L 12/751*       (2013.01)
*H04L 12/815*       (2013.01)

(52) U.S. Cl.
CPC ............ *H04L 12/4641* (2013.01); *H04L 45/00* (2013.01); *H04L 45/02* (2013.01); *H04L 47/22* (2013.01)

(58) Field of Classification Search
None
See application file for complete search history.

(56) References Cited

U.S. PATENT DOCUMENTS

| 5,469,502 | A | * | 11/1995 | Matsumoto | .................... | 379/230 |
| 5,671,216 | A | * | 9/1997 | Subasingha et al. | .......... | 370/230 |
| 5,790,534 | A | | 8/1998 | Kokko et al. | | |
| 5,963,548 | A | * | 10/1999 | Virtanen | ........................ | 370/335 |
| 5,983,282 | A | * | 11/1999 | Yucebay | ........................ | 709/249 |
| 6,005,852 | A | | 12/1999 | Kokko et al. | | |
| 6,154,445 | A | * | 11/2000 | Farris et al. | .................... | 370/237 |
| 6,212,200 | B1 | * | 4/2001 | Iizuka et al. | ................... | 370/468 |
| 6,219,343 | B1 | * | 4/2001 | Honkasalo et al. | ........... | 370/335 |
| 6,493,321 | B1 | * | 12/2002 | Partridge, III | ................ | 370/242 |
| 6,512,761 | B1 | * | 1/2003 | Schuster et al. | ............... | 370/352 |
| 6,587,235 | B1 | * | 7/2003 | Chaudhuri et al. | ........... | 398/140 |

(Continued)

FOREIGN PATENT DOCUMENTS

JP    10-107769    4/1998
JP    2003-60645   2/2003

(Continued)

OTHER PUBLICATIONS

Japanese Office Action issued Nov. 6, 2012 in corresponding Japanese Patent Application No. 2009-063492.

*Primary Examiner* — Ian N. Moore
*Assistant Examiner* — Dung B Huynh
(74) *Attorney, Agent, or Firm* — Staas & Halsey LLP

(57) ABSTRACT

A recording medium, relay node and method are provided. The recording medium having recorded therein a communication program causing non-real time communication to be executed by first and second node groups in a network for conducting real time communication between the nodes through relay devices connecting the first and second node groups. The communication program causing a computer of a local node to execute causing a local node selected from the first node group to set a path leading from the local node to another node selected from the second node group, causing the local node to receive data on the non-real time communication from the other nodes of the first node group than the local node to the other nodes of the second node group than the another node; and transferring from the local node to the another node, the data received, using the path set in the setting.

7 Claims, 22 Drawing Sheets

(56) References Cited

U.S. PATENT DOCUMENTS

| | | | | |
|---|---|---|---|---|
| 6,636,508 B1 * | 10/2003 | Li et al. | | 370/389 |
| 6,879,783 B1 * | 4/2005 | Nakahira | | 398/51 |
| 7,046,631 B1 * | 5/2006 | Giroux et al. | | 370/234 |
| 7,197,330 B1 * | 3/2007 | Monroe et al. | | 455/557 |
| 7,221,683 B2 * | 5/2007 | Brumm et al. | | 370/467 |
| 7,236,804 B2 * | 6/2007 | Immendorf et al. | | 455/557 |
| 7,342,890 B1 * | 3/2008 | Ferguson | | 370/238 |
| 7,352,746 B1 * | 4/2008 | Sekihata | | 370/390 |
| 7,353,255 B2 * | 4/2008 | Acharya et al. | | 709/204 |
| 7,558,250 B2 * | 7/2009 | Little | | 370/352 |
| 7,558,254 B2 * | 7/2009 | Haase et al. | | 370/354 |
| 7,561,512 B1 * | 7/2009 | Chellappa et al. | | 370/217 |
| 7,587,757 B2 * | 9/2009 | Scoggins et al. | | 726/11 |
| 7,593,321 B2 * | 9/2009 | Galand et al. | | 370/218 |
| 7,673,048 B1 * | 3/2010 | O'Toole et al. | | 709/226 |
| 7,707,308 B1 * | 4/2010 | Hogge et al. | | 709/239 |
| 7,852,815 B2 * | 12/2010 | Kezys | | 370/338 |
| 7,940,804 B2 * | 5/2011 | Franke | | 370/503 |
| 8,000,327 B1 * | 8/2011 | Minei et al. | | 370/392 |
| 2001/0002196 A1 * | 5/2001 | Fellman et al. | | 370/442 |
| 2001/0015987 A1 * | 8/2001 | Wegner et al. | | 370/503 |
| 2002/0087716 A1 * | 7/2002 | Mustafa | | 709/236 |
| 2002/0118671 A1 * | 8/2002 | Staples et al. | | 370/352 |
| 2002/0136199 A1 * | 9/2002 | Hartmaier | | 370/352 |
| 2003/0067941 A1 * | 4/2003 | Fall | | 370/468 |
| 2003/0095542 A1 * | 5/2003 | Chang et al. | | 370/352 |
| 2003/0117964 A1 * | 6/2003 | Chen et al. | | 370/252 |
| 2003/0189943 A1 * | 10/2003 | Gorti et al. | | 370/412 |
| 2003/0210769 A1 * | 11/2003 | Clark et al. | | 379/88.01 |
| 2003/0219014 A1 * | 11/2003 | Kotabe et al. | | 370/375 |
| 2004/0042402 A1 * | 3/2004 | Galand et al. | | 370/237 |
| 2004/0054743 A1 * | 3/2004 | McPartlan et al. | | 709/206 |
| 2004/0252676 A1 * | 12/2004 | Bye | | 370/352 |
| 2005/0058149 A1 * | 3/2005 | Howe | | 370/428 |
| 2005/0201364 A1 * | 9/2005 | Dalton et al. | | 370/352 |
| 2006/0039353 A1 * | 2/2006 | Samuel et al. | | 370/352 |
| 2006/0142008 A1 * | 6/2006 | Lee et al. | | 455/436 |
| 2006/0153247 A1 * | 7/2006 | Stumer | | 370/517 |
| 2006/0193246 A1 * | 8/2006 | Brute De Remur et al. | | 370/216 |
| 2006/0198324 A1 * | 9/2006 | Nerses et al. | | 370/260 |
| 2006/0256773 A1 * | 11/2006 | Hume | | 370/352 |
| 2006/0268742 A1 * | 11/2006 | Chu et al. | | 370/254 |
| 2007/0070948 A1 * | 3/2007 | Kezys et al. | | 370/331 |
| 2007/0147263 A1 * | 6/2007 | Liao et al. | | 370/252 |
| 2007/0165637 A1 * | 7/2007 | Harend et al. | | 370/392 |
| 2007/0180283 A1 * | 8/2007 | Shinkai et al. | | 713/320 |
| 2008/0052401 A1 * | 2/2008 | Bugenhagen et al. | | 709/227 |
| 2008/0084836 A1 * | 4/2008 | Baird et al. | | 370/311 |
| 2008/0095119 A1 * | 4/2008 | Bachmann et al. | | 370/332 |
| 2008/0095144 A1 * | 4/2008 | Goldberg | | 370/352 |
| 2008/0112422 A1 * | 5/2008 | Jetcheva et al. | | 370/406 |
| 2008/0146256 A1 * | 6/2008 | Hawkins et al. | | 455/466 |
| 2008/0198811 A1 * | 8/2008 | Deshpande et al. | | 370/332 |
| 2009/0028059 A1 * | 1/2009 | Barbaresi et al. | | 370/250 |
| 2009/0103530 A1 * | 4/2009 | Fartmann et al. | | 370/389 |
| 2009/0147778 A1 * | 6/2009 | Wanless et al. | | 370/389 |
| 2009/0154488 A1 * | 6/2009 | Oron et al. | | 370/458 |
| 2009/0268746 A1 * | 10/2009 | Ogasahara et al. | | 370/406 |
| 2010/0177642 A1 * | 7/2010 | Sebastian et al. | | 370/248 |
| 2010/0177680 A1 * | 7/2010 | Fischer et al. | | 370/328 |
| 2010/0182921 A1 * | 7/2010 | Basart et al. | | 370/252 |

FOREIGN PATENT DOCUMENTS

| | | |
|---|---|---|
| JP | 2007-324987 | 12/2007 |
| WO | WO 2007014821 A1 * | 2/2007 |

* cited by examiner

FIG. 4B

ADDRESS TABLE 401

| NODE ID | SYSTEM NODE ADDRESS | CORRESPONDING PHYSICAL ADDRESS | GROUP NODE ADDRESS | CORRESPONDING PHYSICAL ADDRESS |
|---|---|---|---|---|
| N1 | 10.xxx.1.1 | 000000000001 | 172.xxx.1.1 | 000000000001 |
| N2 | 10.xxx.1.2 | 000000000002 | 172.xxx.1.2 | 000000000002 |
| N3 | 10.xxx.1.3 | 000000000003 | 172.xxx.1.3 | 000000000003 |
| N4 | 10.xxx.1.4 | 000000000004 | 172.xxx.2.1 | — |
| N5 | 10.xxx.1.5 | 000000000005 | 172.xxx.2.2 | — |
| N6 | 10.xxx.1.6 | 000000000006 | 172.xxx.2.3 | — |
| N7 | 10.xxx.1.7 | 000000000007 | 172.xxx.3.1 | — |
| N8 | 10.xxx.1.8 | 000000000008 | 172.xxx.3.2 | — |
| N9 | 10.xxx.1.9 | 000000000009 | 172.xxx.3.3 | — |
| N10 | 10.xxx.1.10 | 000000000010 | 172.xxx.4.1 | — |
| N11 | 10.xxx.1.11 | 000000000011 | 172.xxx.4.2 | — |
| N12 | 10.xxx.1.12 | 000000000012 | 172.xxx.4.3 | — |

FIG. 4C

| DESTINATION ADDRESS | PHYSICAL ADDRESS |
|---|---|
| 10.xxx.1.1 (SYSTEM NODE ADDRESS) | 000000000001 |
| 10.xxx.1.2 (SYSTEM NODE ADDRESS) | 000000000002 |
| ... | ... |
| 10.xxx.1.11 (SYSTEM NODE ADDRESS) | 000000000011 |
| 10.xxx.1.12 (SYSTEM NODE ADDRESS) | 000000000012 |
| 172.xxx.1.1 (GROUP NODE ADDRESS) | 000000000001 |
| 172.xxx.1.2 (GROUP NODE ADDRESS) | 000000000002 |
| 172.xxx.1.3 (GROUP NODE ADDRESS) | 000000000003 |
| GROUP NODE ADDRESS OTHER THAN FOR GROUP G1 | 000000000001 (RELAY NODE) |

TRANSMITTING DESTINATION LIST — 402

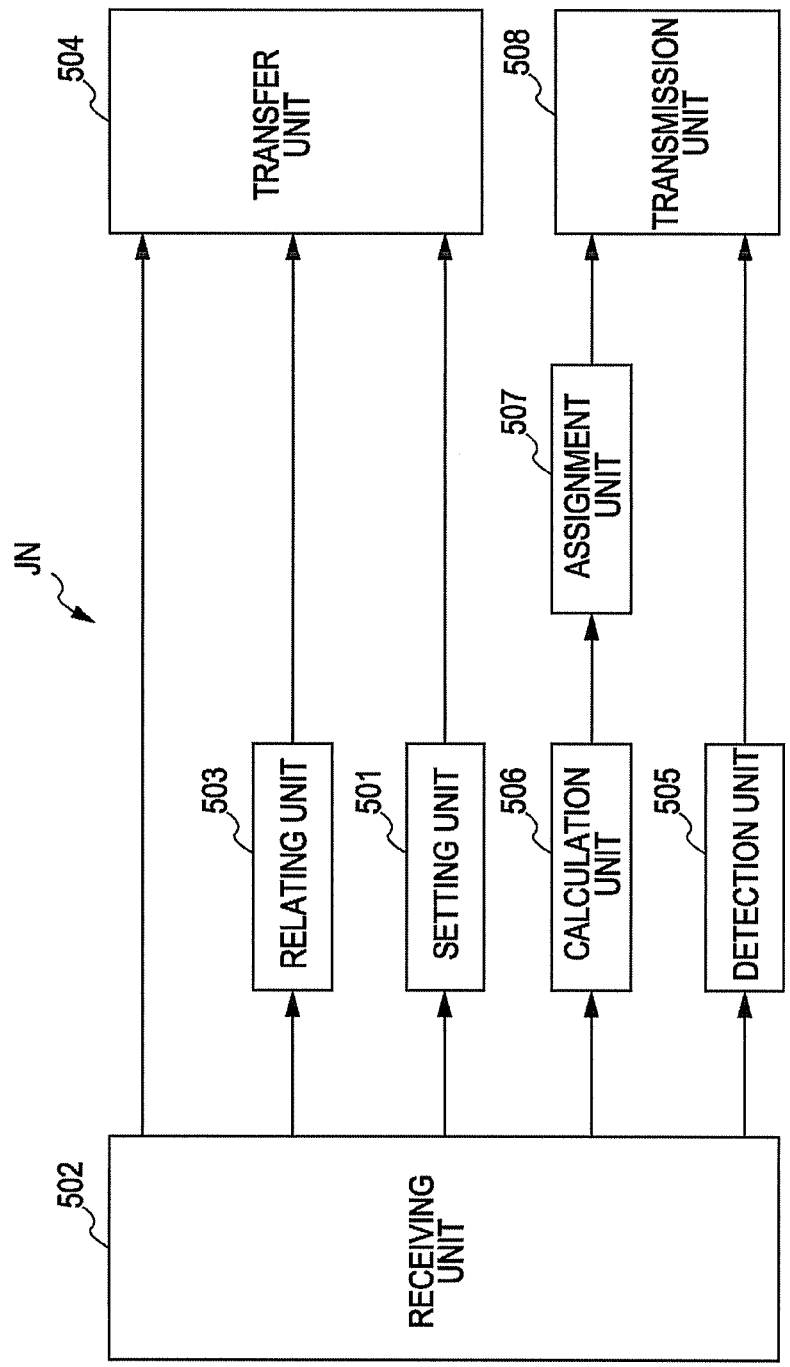

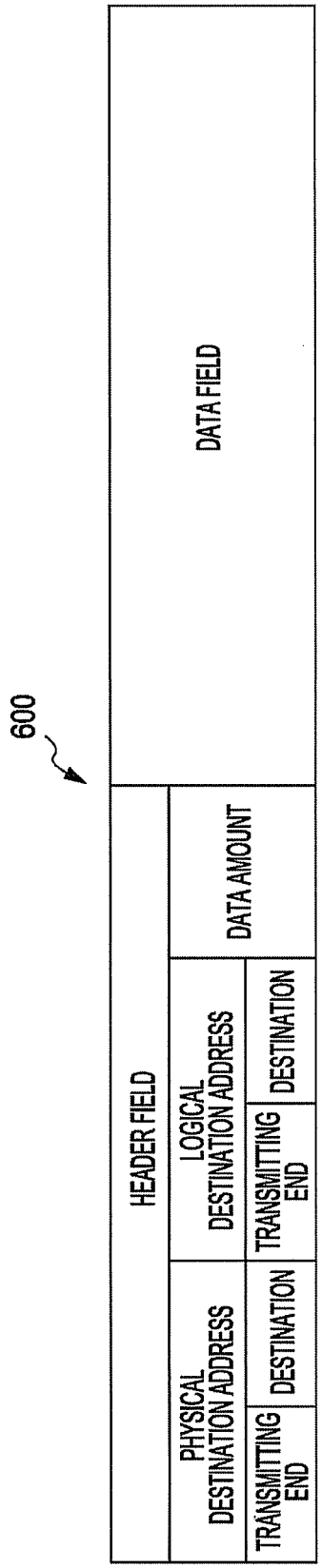

| DESTINATION ADDRESS | TRANSFER DESTINATION |
|---|---|
| 172.xxx.1.1 (GROUPG1) | 000000000001 (PHYSICAL ADDRESS) |
| 172.xxx.1.2 (GROUPG1) | 000000000002 (PHYSICAL ADDRESS) |
| 172.xxx.1.3 (GROUPG1) | 000000000003 (PHYSICAL ADDRESS) |
| 172.xxx.2.1 (GROUPG2) | VL1 (VL1-2) |
| 172.xxx.2.2 (GROUPG2) | VL1 (VL1-2) |
| 172.xxx.2.3 (GROUPG2) | VL1 (VL1-2) |
| 172.xxx.3.1 (GROUPG3) | VL2 (VL1-3) |
| 172.xxx.3.2 (GROUPG3) | VL2 (VL1-3) |
| 172.xxx.3.3 (GROUPG3) | VL2 (VL1-3) |
| 172.xxx.4.1 (GROUPG4) | VL3 (VL1-4) |
| 172.xxx.4.2 (GROUPG4) | VL3 (VL1-4) |
| 172.xxx.4.3 (GROUPG4) | VL3 (VL1-4) |

CORRESPONDENCE TABLE — 700

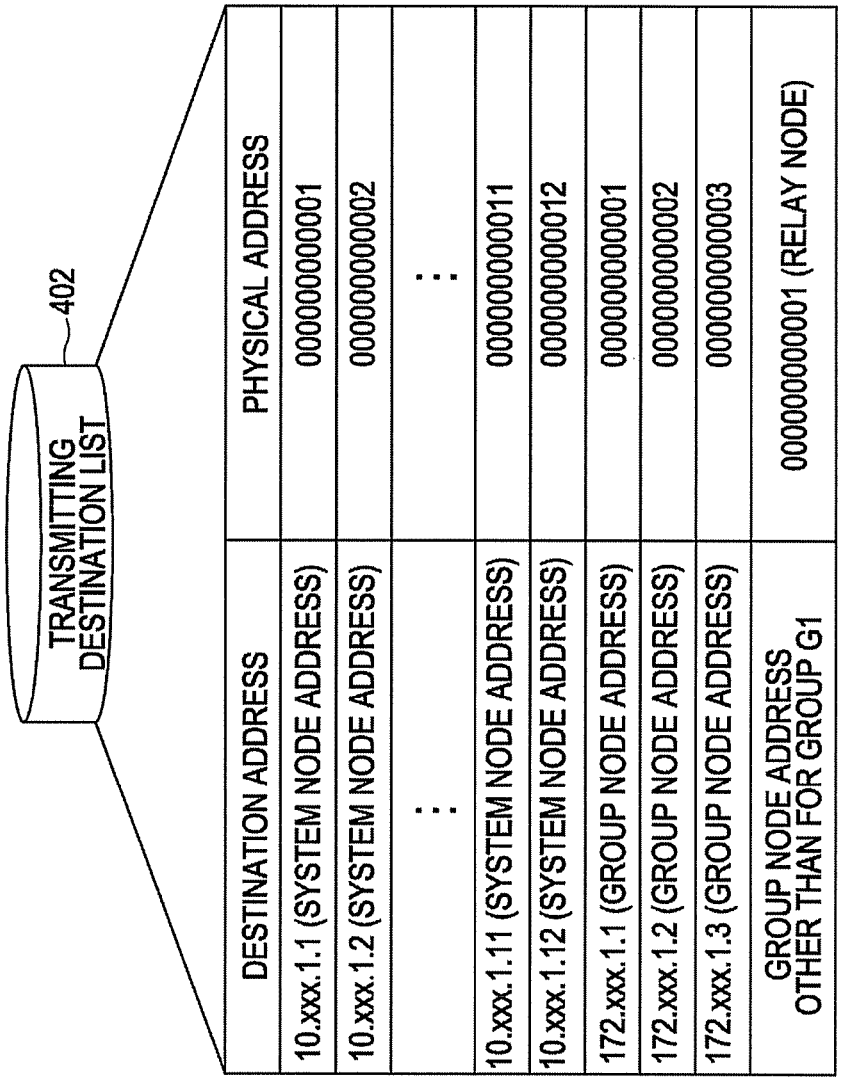

RECORDING MEDIUM HAVING COMMUNICATION PROGRAM RECORDED THEREIN, RELAY NODE AND COMMUNICATION METHOD

CROSS-REFERENCE TO RELATED APPLICATIONS

This application is related to and claims priority to Japanese Patent Application No. 2009-63492, filed on Mar. 16, 2009, and incorporated herein by reference.

BACKGROUND

1. Field

The embodiments discussed herein are directed to a recording medium having recorded therein a communication program for transferring information, a relay node and a communication method.

2. Description of the Related Art

In recent years, mechanically controlled apparatuses such as automobiles, industrial robots and humanoid robots have been modularized according to function. With sensors having a network function, the terminal devices (modules) mounted on the mechanically controlled apparatus may make up a network.

In these mechanically controlled apparatuses including a network, real time communication and non-real time communication may coexist. The real time communication may be conducted periodically for feedback control, for example, and has a small absolute delay, while the non-real time communication is the communication which, though not required to have the real time property, may be required to have a high throughput such as the distribution of a correction program or the file transfer.

On the other hand, the mechanically controlled apparatus including a network desirably uses a multipurpose network (for example, Ethernet) including a centralized distribution device such as a switching device in the path to secure the flexibility and extendibility and the ease with which a system configuration is implemented.

In a case where a plurality of inputs transferred to the same output terminal of the switching device exceed the throughput of the output terminal, however, the communication queue in the switching device would generally grow. The network including a switching device midway of the path, therefore, poses the problem that the growth of the communication queue often increases the communication delay and causes the loss of packets, thereby making it difficult to carry out the real time communication properly.

In view of this, a conventional technique is available in which the periods of carrying out the real time communication and the non-real time communication are differentiated temporally taking advantage of the periodicity of the real time communication. Teethe terminal device at the receiving end monitors the communication situation of the data transmitted thereto to detect the non-real time communication interfering with the real time communication, and by limiting the flow rate of the non-real time communication, prevents the growth of the communication queue in the switching device (see, for example, Japanese Unexamined Patent Publication No. 10-107769).

The conventional technique described above, however, fails to take into consideration the topology in which the terminal devices for transmitting and receiving the data are connected through a plurality of switching devices. The network including a plurality of switching devices on the path connecting the terminal devices, therefore, harbors the problem that it is difficult to control the flow rate of the non-real time communication, so that the real time communication may not be carried out properly.

Another problem is that as long as a network system cannot be constructed using a plurality of switching devices, the maximum number of connectable terminal devices is limited, thereby reducing the flexibility and extendibility of the system configuration.

FIG. 22 illustrates problems of a conventional technique. In a network system 2200, terminal devices 2201 to 2203 and terminal devices 2204 to 2206 are connected to each other through switching devices 2210, 2220. Terminal devices 2201 to 2203 are defined as the transmitting end, and the terminal devices 2204 to 2206 as the receiving end.

In the network system 2200, the data transmitted from the transmitting end to the receiving end conflict with each other between the switching device 2210 and the switching device 2220. In the process, the data transmitted from the terminal devices 2201, 2202 to the terminal device 2204 can be detected by the terminal device 2204.

The data transmitted from the terminal device 2203 to the terminal device 2206, however, cannot be detected by the terminal device 2204. At the receiving end, therefore, it is difficult to control the flow rate correctly by detecting the non-real time communication interfering with the real time communication. The communication queue is increased in the switching device 2210 and the data for the real time communication may not be processed within a specified time.

SUMMARY

It is an aspect of the embodiments discussed herein to provide a recording medium having recorded therein a communication program causing non-real time communication to be executed by first and second node groups in a network for conducting real time communication between the nodes through relay devices connecting the first and second node groups and a method.

The above aspects can be attained by a recording medium having recorded therein a communication program causing a computer of a local node to execute operations including causing a local node selected from the first node group to set a path leading from the local node to another node selected from the second node group causing the local node to receive data on the non-real time communication from the other nodes of the first node group than the local node to the other nodes of the second node group than the another node and transferring from the local node to the another node, the data received, using the path set in the setting.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF DRAWINGS

FIG. 4B illustrates an example of the contents stored in the address table;

FIG. 4C illustrates an example of the contents stored in a transmitting destination table;

FIG. 5 illustrates a relay node;

FIG. 6 illustrates data structure of non-real time communication data;

FIG. 22 illustrates problems of a conventional technique.

DESCRIPTION OF EMBODIMENTS disclosed In an exemplary communication method, the non-real time communication is controlled not to interfere with the real time communication in a local network in which the real time communication carried out periodically coexists with the non-real time communication carried out at irregular time intervals.

Figure 1:
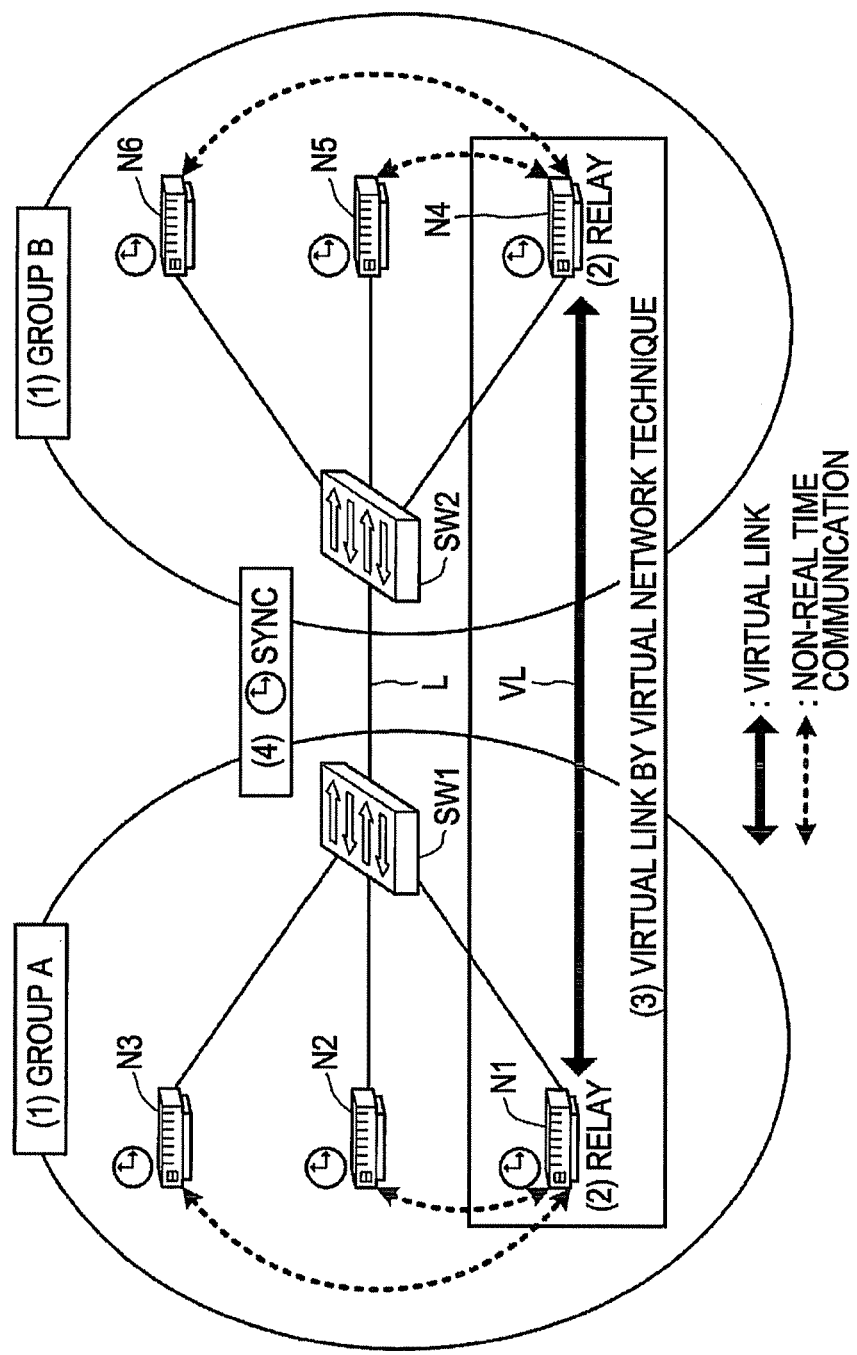
FIG. 1 illustrates an exemplary communication method.

FIG. 1 illustrates an outline of this communication method. As illustrated in FIG. 1, a group of nodes N1 to N3 and a group of nodes N4 to N6 are connected through switching devices SW1, SW2 in a local network. The operations described below may be performed in the local network including a plurality of the switching devices SW1, SW2 as illustrated in FIG. 1.

The nodes directly connected to each of the switching devices SW1, SW2 are grouped. In an exemplary case, the nodes N1 to N3 directly connected to the switching device SW1 form a group A, and the nodes N4 to N6 directly connected to the switching device SW2 form a group B.

A relay node for repeating the non-real time communication between the groups is arranged in each of the groups A and B. In an exemplary case, the node N1 is selected from the nodes N1 to N3, and the node N4 from the nodes N4 to N6, as a relay node. In this way, the non-real time communication through the switching devices SW1, SW2 is concentrated on the relay nodes N1, N4.

Using the existing virtual network technique, a virtual link is set which leads from the relay node N1 to the relay node N4 (hereinafter referred to as "the virtual link VL"). The non-real time communication between the relay nodes N1 and N4 is collected to reduce the conflict with the real time communication in a physical link L between the switching devices SW1 and SW2.

In order that the execution period of the real time communication and the non-real time communication are shared by all the nodes N1 to N6, all the nodes N1 to N6 are synchronized. The execution time of the real time communication and the non-real time communication can be discriminated from each other, and the non-real time communication is controlled not to interfere with the real time communication.

According to this communication method, the non-real time communication between the groups through the switching devices SW1, SW2 are concentrated and controlled using the virtual link VL connecting the relay nodes N1 and N4 to each other thereby to reduce the interference with the real time communication. Although the relay nodes N1, N4 are selected from the node groups N1 to N3 and N4 to N6, respectively, In an exemplary case, the embodiments are not limited to this configuration. For example, apart from the nodes N1 to N6, a dedicated relay node for relaying the non-real time communication between the groups A and B may be arranged.

Figure 2:
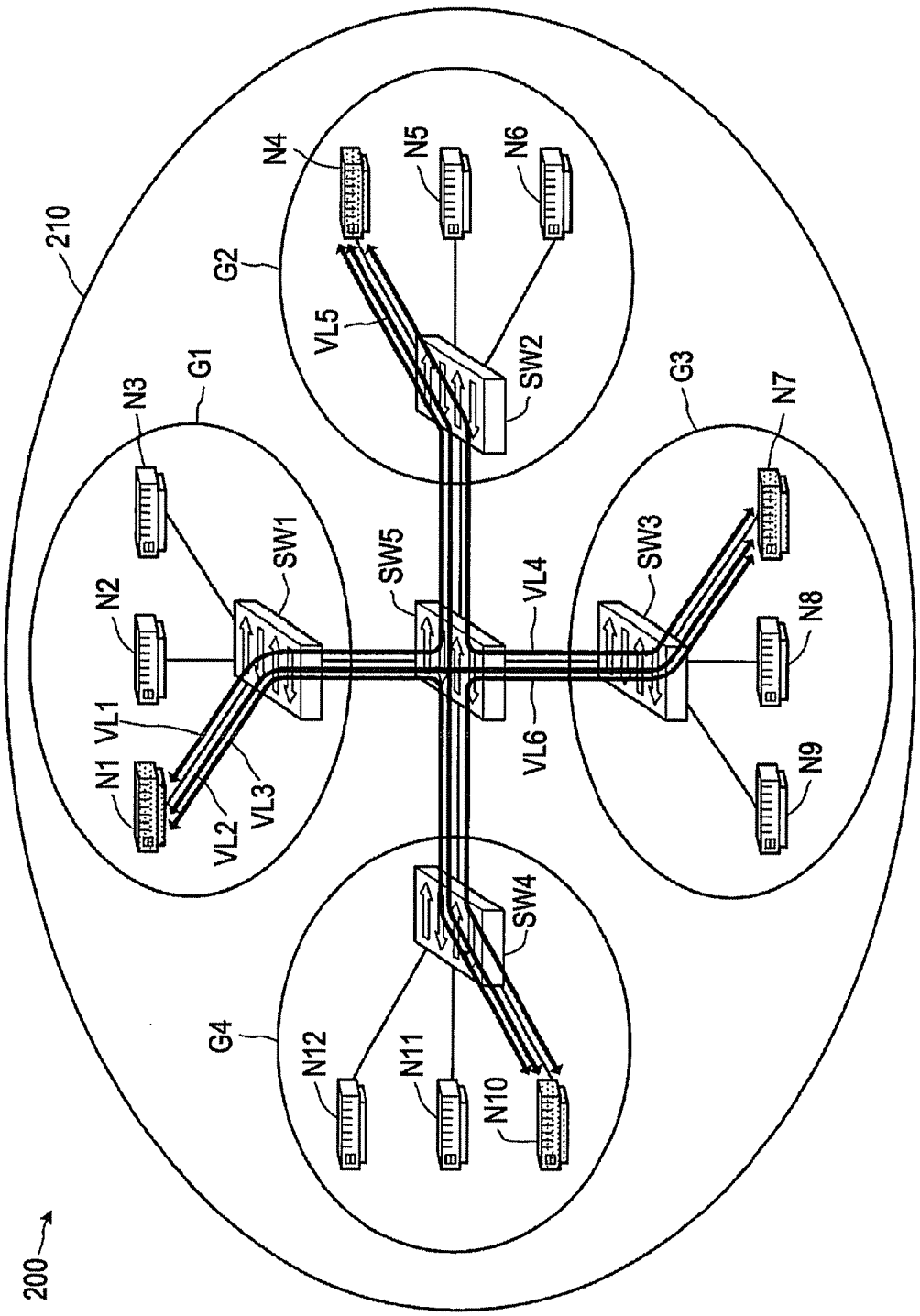
FIG. 2 illustrates a network system according to an embodiment.

FIG. 2 illustrates a network system according to an embodiment. In a network system 200, nodes N1 to N12 are connected with switching devices SW1 to SW5 in communicable way through a network 210 such as the LAN (Local Area Network).

The nodes N1 to N12 are communication devices having the communication function (real time communication and non-real time communication) such as an ECU (electric control unit), a sensor or an actuator mounted on a vehicle or robot. The switching devices SW1 to SW5 are relay devices.

In the network system 200, groups G1 to G4 are formed by the node groups N1 to N3, N4 to N6, N7 to N9 and N10 to N12, respectively, directly connected to the switching devices SW1 to SW4. The groups G1 to G4 have the relay nodes N1, N4, N7 and N10, respectively, to relay the non-real time communication between the groups.

The network system 200 has the virtual links VL1 to VL6 connecting the relay nodes. The relay node N1 of the group G1 may be connected with the relay nodes N4, N7, N10 of the groups G2 to G4 by virtual links VL1 to VL3. The relay node N4 of the group G2 may be connected with the relay nodes N7, N10 of the groups G3, G4 by virtual links VL4, VL5. Further, the relay node N7 of the group G3 may be connected with the relay node N10 of the group G4 by a virtual link VL6.

Figure 3:
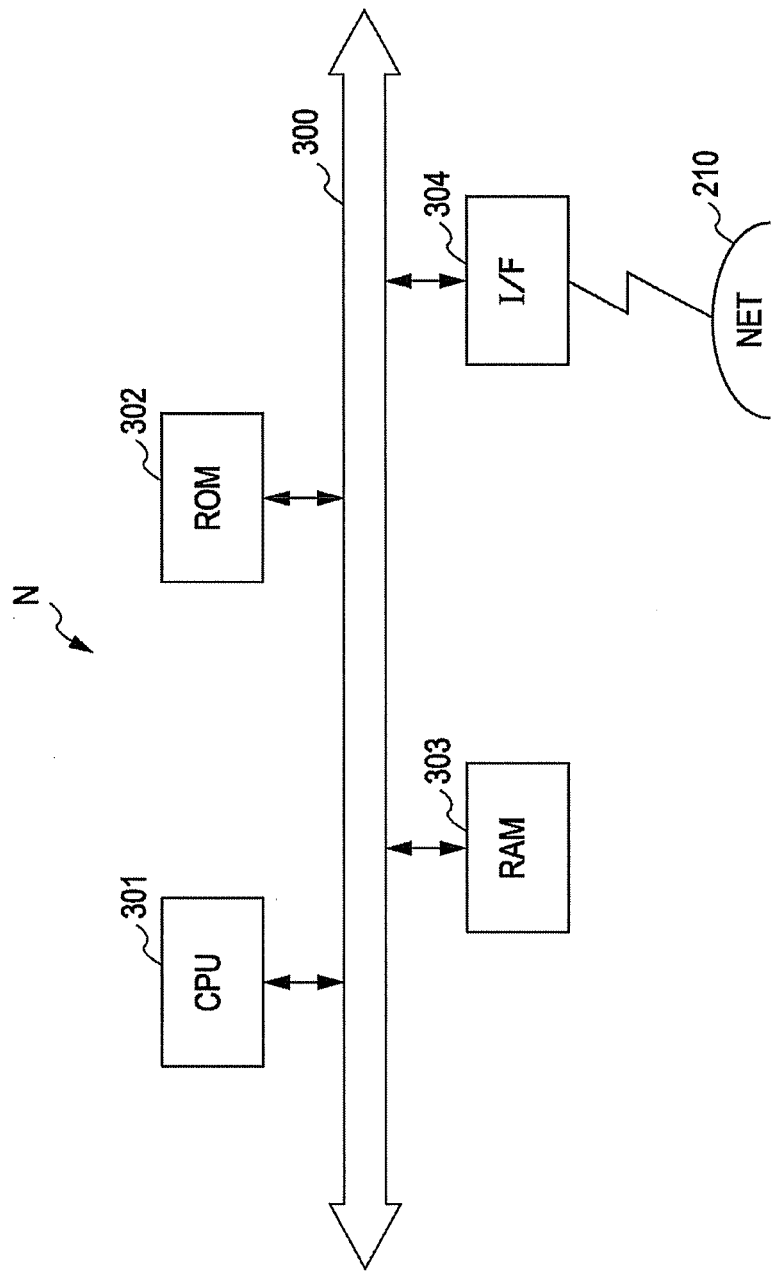
FIG. 3 illustrates hardware configuration of a node according to an embodiment.

FIG. 3 illustrates a node according to an embodiment. In FIG. 3, each of the nodes N1 to N12 (hereinafter referred to simply as "the node N") includes a CPU (Central Processing Unit) 301, a ROM (read-only memory) 302, a RAM (random access memory) 303 and an I/F (interface) 304. The node N may further include a magnetic disk drive, a magnetic disk, an optical disk drive and an optical disk. These component parts are connected to each other through a bus 300.

The CPU 301 takes charge of controlling the node N as a whole. The ROM 302 stores the programs such as a boot program. The RAM 303 is used as a work area of the CPU 301. The interface (hereinafter referred to as "the I/F") 304 may be connected to a network 210 such as the LAN through a communication line and, through the network 210, further to other devices. The I/F 304, which acts as an interface between the network 210 and the internal components therein, controls the data input/output from and to the external devices.

The magnetic disk drive controls the operation of reading and writing the data from and into the magnetic disk under the control of the CPU 301. The magnetic disk stores the data written therein under the control of the magnetic disk drive. The optical disk drive controls the operation of reading and writing the data from and into the optical disk under the control of the CPU 301. The optical disk stores the data written under the control of the optical disk drive or causes a computer to read the data stored in the optical disk.

Various address tables used by the node N are disclosed. The address table is stored in each of the storage units such as the ROM 302, the RAM 303, the magnetic disk and the optical disk illustrated in FIG. 3. In the description that follows, those nodes of the network 210 for relaying the non-real time communication are each referred to as "the relay node JN", and the other nodes N than the relay nodes JN as "the normal node SN".

Figure 4A:
FIG. 4A illustrates an example of contents stored in an address table.

FIG. 4A illustrates an example of the contents stored in the address table. In FIG. 4A, the address table 400 has the node ID, the physical address, the system node address, the group node address and the information on the relay node. The address table 400 is held in each of the nodes N1 to N12 in the network system 200.

The node ID is an identifier of the node N. The physical address is an address unique to the I/F 304 connected to the LAN and, for example, the MAC address of the Ethernet. The system node address is the address of the node N uniquely determined from the network system 200 as a whole. The group node address is the address of the node N uniquely determined for each of the groups G1 to G4 in the network system 200.

In the example illustrated in FIG. 4A, the first to third ones of the four numerals defined by the dot "." in the group node address are the group number for identifying the groups G1 to G4, and the fourth numeral indicates the node number for identifying the node N in the particular group. The expression "/3" indicates that the first three numerals represent the group number. By changing the number of the numerals assigned to the group number and the node number, the number of groups and the number of nodes in each group in the system are adjusted.

FIG. 4B illustrates an example of the contents stored in the address table. In FIG. 4B, the address table 401 includes a node ID, a system node address, a corresponding physical address, a group node address and a corresponding physical address. The address table 401 is held in the node N associated with the group G1.

The system node address and the group node address are each set in correspondence with a physical address (corresponding physical address). The data with the system node address or the group node address is transmitted directly to the node N of the corresponding physical address. The data having no corresponding physical address which is to be transmitted to the group node address of a group different from the group with which the data is associated is transferred through the relay node.

The relay node is determined by preset information or a selected algorithm. At least one relay node is determined always in each group. The path for each of the other nodes transmitting the data to a group different from the group with which the particular node is associated is set in such a manner as to transfer the data through the determined relay node (FIG. 4C).

FIG. 4C illustrates an example of the contents stored in the transmitting destination table. In a transmitting destination table 402 of FIG. 4C, a destination address and the physical address of the node N constituting the transmitting destination of the node N associated with the group G1 are illustrated in correspondence with each other.

A relay node JN (the nodes N1, N4, N7, N10 in the network system 200, for example) is disclosed. FIG. 5 illustrates relay node. In FIG. 5, the relay node JN includes a setting unit 501, a receiving unit 502, a relating unit 503, a transfer unit 504, a detection unit 505, a calculation unit 506, an assignment unit 507 and a transmission unit 508. These functions (the units 501 to 508) are controlled, for example, through the I/F 304 or by causing the CPU 301 to execute the programs stored in the storage units such as the ROM 302, the RAM 303, the magnetic disk and the optical disk illustrated in FIG. 3.

The setting unit 501 may perform setting a path leading from a node (hereinafter referred to as the local node) selected from the first node group to another node selected from the second node group in the network 210. In this case, the network 210 is, for example, a local network including a plurality of switching devices. Also, each node group is a mass of nodes directly connected to each switching device in the network 210.

The node N1 in the network system 200 may be s assumed to be the relay node JN. In other words, the nodes N1 to N3 make up a first node group, and the nodes N4 to N6, the nodes N7 to N9 and the nodes N10 to N12 make up a second node group.

Assuming that the address table 400 illustrated in FIG. 4A provides the system setting information, the setting unit 501 specifies other nodes N4, N7, N10 set as "YES" in the field of the relay nodes other than the local node N1. The setting unit 501, using the existing virtual network technique, sets virtual links VL1 to VL3 (FIG. 2) connecting the local node N1 and other nodes N4, N7, N10, respectively.

An overlay network, for example, can be used as the virtual network. The method of setting the virtual link, however, is an existing technique and therefore not disclosed in detail. The setting result is stored in the storage units such as the RAM 303, the magnetic disk and the optical disk.

The receiving unit 502 may receive the data on the non-real time communication (hereinafter referred to as "the non-real time data") from the normal node SN included in the first node group. The non-real time data is the data of which the real time property is not required, and for example, the correction data for an improved program. Specifically In an exemplary case, the non-real time data transmitted from the normal node SN of the first node group to the normal node SN of the second node group is involved.

More The receiving unit 502, for example, receives the non-real time data for the node N5 of the group G2 from the node N3 of the group G1 through the switching device SW1. Incidentally, the result thus received is stored in the storage units such as the RAM 303, the magnetic disk and the optical disk.

The data structure of the non-real time data is disclosed. FIG. 6 illustrates an example of the data structure of the non-real time data. In FIG. 6, a data structure 600 has a header field and a data field. A physical destination address, a logical destination address and a data amount are set in the header field. In the data field, on the other hand, the data exchanged by the applications of the nodes N are written.

The physical destination address is a physical address indicating the destination (transmitting destination) to which the non-real time data is directly transmitted. The logical destination address, on the other hand, is a logical address indicating the final destination of the non-real time data. The logical destination address specifically corresponds to the system node address and the group node address. In an exemplary case, the group node address valid only in each group is set as a logical destination address. The data amount is that of the non-real time data.

The switching devices SW1 to SW4 illustrated in FIG. 2 transfer the received data to the destination node in accordance with the physical destination address designated.

The relating unit 503 illustrated in FIG. 5 may perform relating the received non-real time data and the set path to each other. Incidentally, the non-real time data for this case is received from the normal node SN of the first node group. The relating unit 503 generates a correspondence table 700 (FIG. 7), for example, to determine the transfer destination from the destination address based on the address table 400 provided as the system setting information.

Figure 7:
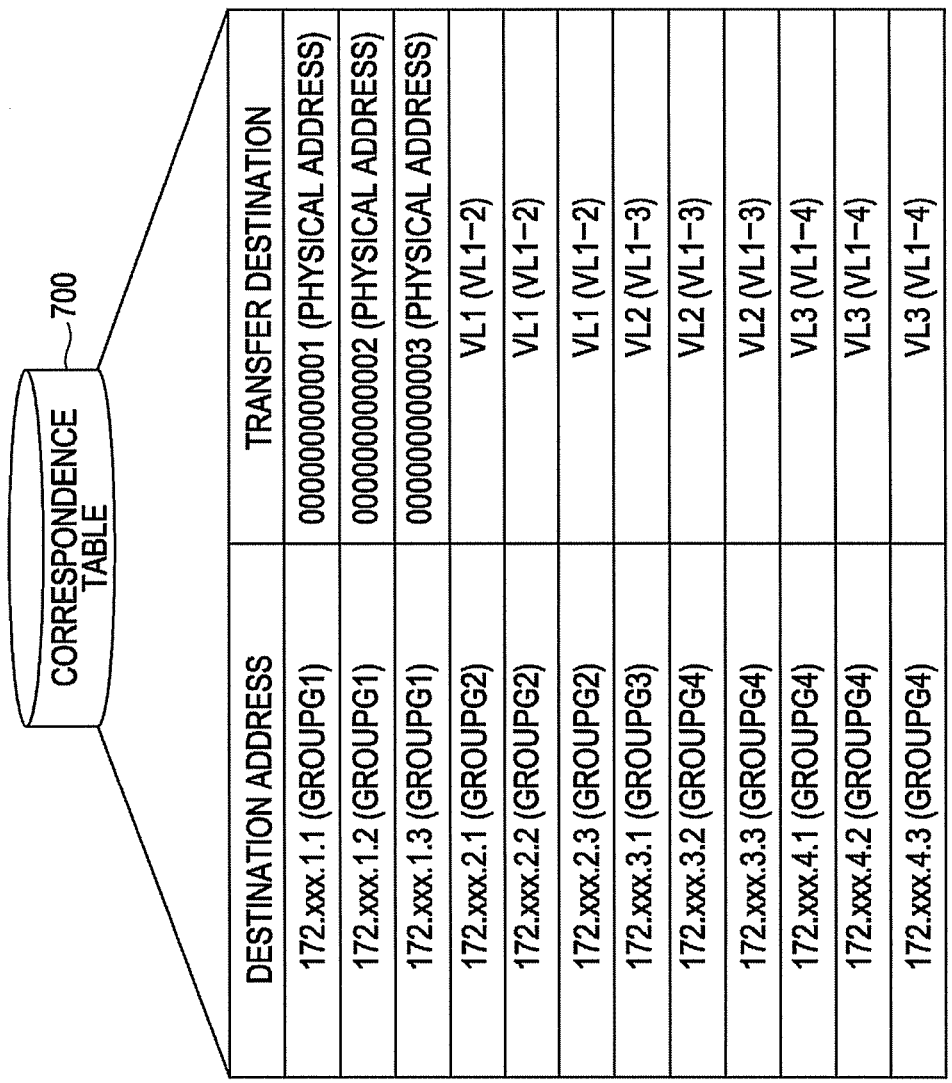
FIG. 7 illustrates a correspondence table.

FIG. 7 illustrates a specific example of the correspondence table. In FIG. 7, the correspondence table 700 has the fields of the destination address and the transfer destination. By setting the information in each field, the transfer destination of the non-real time data is stored as a record.

In FIG. 7, "VLM-N" designates the virtual link from the group GM to the group GN. Also, "VLM-N" and "VLN-M" indicate the same virtual link. Although each destination address is illustrated to have a transfer destination in FIG. 7, the correspondence table for transfer outside of the group is managed for each group number.

The transfer unit 504 illustrated in FIG. 5 may perform transferring the received non-real time data. The transfer unit 504 transfers the received non-real time data to another node with reference to the correspondence table 700 illustrated in FIG. 7.

The detection unit 505 may perform detecting the time point to start the period of the real time communication executed periodically in the network 21. As a specific example, the detection unit 505 counts the time in the local node and detects the time to start the period of the real time communication. The time interval of the real time communication periodically executed is set in advance.

The transmission unit 508 transmits a sync packet to another node as the result of detecting the period starting time of the real time communication. The sync packet assigned an identifier to assure synchronism of the timing of carrying out the real time communication is transmitted to another node by the transmission unit 508. The synchronism can be secured between the relay nodes JN in the network system 200.

Further, the transmission unit 508 transmits the sync packet to the normal node SN. The synchronism can be secured among all the nodes in the group. The sync packet is transmitted from the local node to all the nodes N other than the local node in the network system 200 thereby to secure the synchronism among all the nodes N1 to N12.

In the case where the detection unit 505 receives the sync packet from other node before the period starting time of the real time communication, however, the sync packet receiving time is detected as the period starting time of the real time communication. Incidentally, the detection result is stored in the storage units such as the RAM 303, the magnetic disk and the optical disk.

The transfer unit 504 may transfer the non-real time data to other nodes at the time different from the detected period starting time for the real time communication. By doing so, the execution timing can be distinguished between the real time communication and the non-real time communication, thereby making it possible to avoid the conflict between the real time communication and the non-real time communication through the relay devices (such as the switching devices SW1 to SW5).

The time interval of the real time communication executed periodically is designated as a first period, and the first period divided by M as a second period for executing the process of transferring the non-real time data. The value M, however, may be set arbitrarily in keeping with the system requirements, etc. of the network system 200.

The receiving unit 502 also receives the non-real time data from other nodes using a set path. The receiving unit 502 receives the non-real time data from the node N4, for example, using the virtual link VL1. The non-real time data transferred from other nodes has set therein the group node address of the normal node SN in the same group as the local node.

Figure 8:
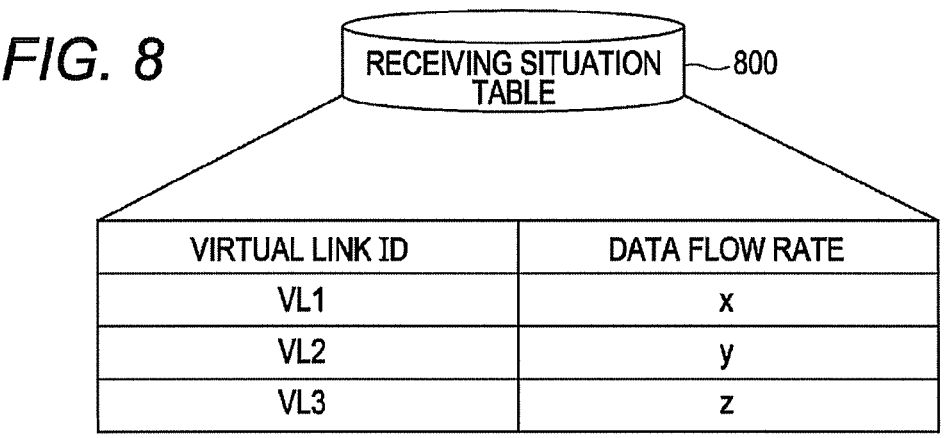
FIG. 8 illustrates an example of the contents stored in a receiving situation table.

FIG. 8 illustrates an example of the contents stored in the receiving situation table. In FIG. 8, a receiving situation table 800 has the fields for the virtual link ID and the data flow rate and stores the data flow rate for each of the virtual links VL1 to VL3 as a record. The data flow rate is defined as the amount of the non-real time data received from other nodes in the preceding phase of the second period. The data flow rate is expressed by, for example, the communication speed (Mbps, Kbps, etc.) per unit time.

The transfer unit 504 may perform transferring the received non-real time data to the normal node SN. The transfer unit 504 transfers, through the switching device SW1, the received non-real time data to the group node address set in the particular non-real time address.

The non-real time data from the normal node SN in other groups can be transferred to the normal node SN in the same group. The transfer unit 504 may transfer the non-real time data to the normal node SN in accordance with the data flow rate assigned to the physical link PL connecting the local node and the normal node SN.

The calculation unit 506 may perform calculating the data flow rate assigned to the set path based on the transmission capacity of the network 210. The transmission capacity of the network 210 is, for example, the capacity (communication speed per unit time) of the physical link of the network system 200. The calculation unit 506 divides the capacity of the physical link by the set number of the virtual links VL and thus calculates the data flow rate assigned to each virtual link VL.

As an example, assume that the capacity of the physical link of the network system 200 is 12 [Mbps]. In this case, the data flow rate assigned to each of the virtual links VL1 to VL3 is 4 (=12/3) [Mbps]. In this way, the capacity of the physical link can be assigned equally among the virtual links VL1 to VL3. The calculation result is stored in the storage units such as the RAM 303, the magnetic disk and the optical disk.

The calculation unit 506, based on the flow rate of the non-real time data received from other nodes, may calculate the data flow rate assigned to the set path. As a specific example, the data flow rate assigned to the virtual links VL1 to VL3 is calculated by the calculation unit 506 based on the flow rate of the non-real time data received from other nodes N4, N7, N10, with reference to the receiving situation table 800 illustrated in FIG. 8.

The data flow rate is calculated for each of the virtual links VL1 to VL3 in such a manner as not to exceed the capacity of the physical link while at the same time securing the maximum effective utilization. The data flow rate assigned to the virtual links VL1 to VL3 can be controlled dynamically in accordance with the communication situation of the non-real time communication between the relay nodes. Incidentally, the method of controlling the data flow rate assigned in accordance with the communication situation is the existing technique, and therefore, not disclosed in detail.

The assignment unit 507 assigns the calculated data flow rate to the set path. The assignment unit 507 relates the virtual link VL connecting the local node and other nodes to the data flow rate assigned to the particular virtual link VL and stores the relation in an assignment table 900 illustrated in FIG. 9. An example of the contents stored in the assignment table 900 is disclosed.

Figure 9:
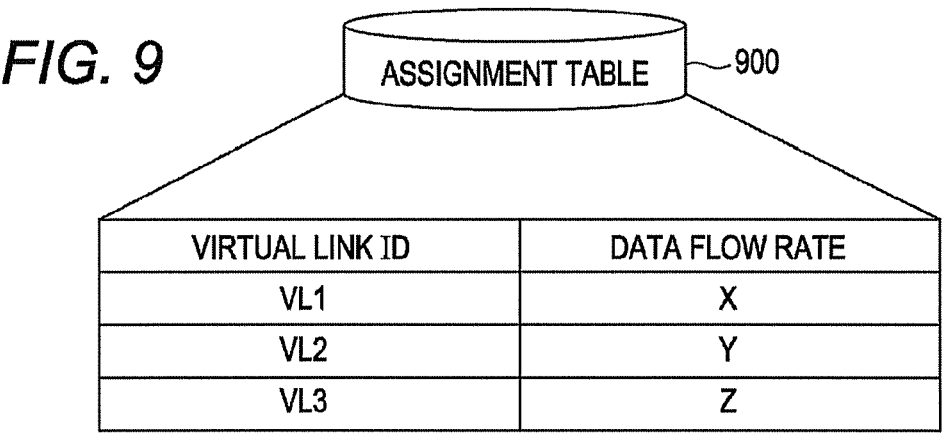
FIG. 9 illustrates an example of the contents stored in an assignment table.

FIG. 9 illustrates an example of the contents stored in the assignment table. In FIG. 9, the assignment table 900 has the fields of the virtual link ID and the data flow rate, and stores the assignment result for each of the virtual links VL1 to VL3 as a record. Incidentally, the assignment table 900 is stored in the storage devices such as the RAM 303, the magnetic disk and the optical disk.

The transmission unit 508 may perform transmitting the assignment result to other nodes. As a specific example, the transmission unit 508, first referring to the assignment table 900, specifies the data flow rate assigned to the virtual link VL connecting the local node and other nodes. The transmission unit 508 specifies the system node address of other nodes by reference to the address table 400. Then, the transmission unit 508 transmits the specified data flow rate to other nodes using the specified system node address.

The receiving unit 502 may perform receiving, from other nodes, the result of assignment to the path leading from the local node to other nodes. The received assignment result of the virtual link VL is stored in an assignment table 1000 illustrated in FIG. 10 by the relating unit 503 relating it to the virtual link ID.

Figure 10:
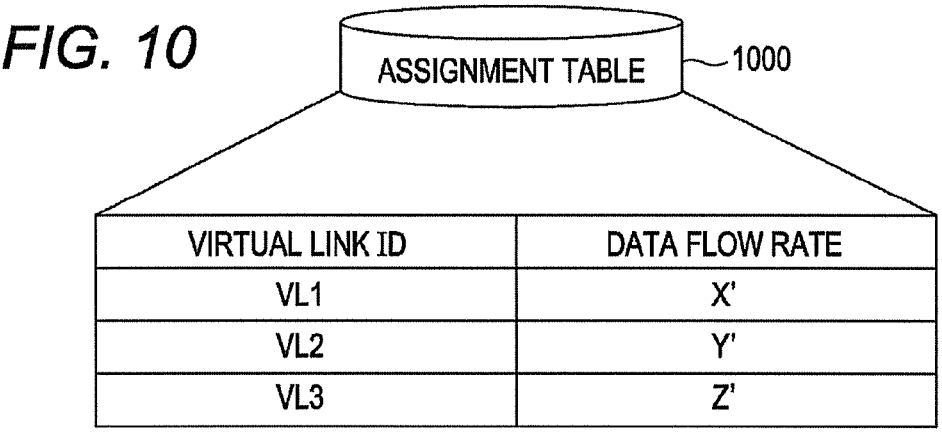
FIG. 10 illustrates an example of the contents stored in the assignment table.

FIG. 10 illustrates an example of the contents stored in the assignment table. In FIG. 10, the assignment table 1000 has the fields of the virtual link ID and the data flow rate, and stores the assignment result for each of the virtual links VL1 to VL3 as a record. Incidentally, the assignment table 1000 is stored in the storage devices such as the RAM 303, the magnetic disk and the optical disk.

The transfer unit 504 may perform transferring the non-real time data to other nodes in accordance with the assignment result received. The transfer unit 504, with reference to the assignment table 1000, transfers the non-real time data to the node N4 in such a manner as not to exceed the data flow rate X' assigned to the virtual link VL1. The non-real time communication exceeding the capacity of the physical link in the network system 200 is avoided, and the increase in the communication queue of the switching device SW1 can be suppressed.

(Functional Configuration of Normal Node)

Figure 11:
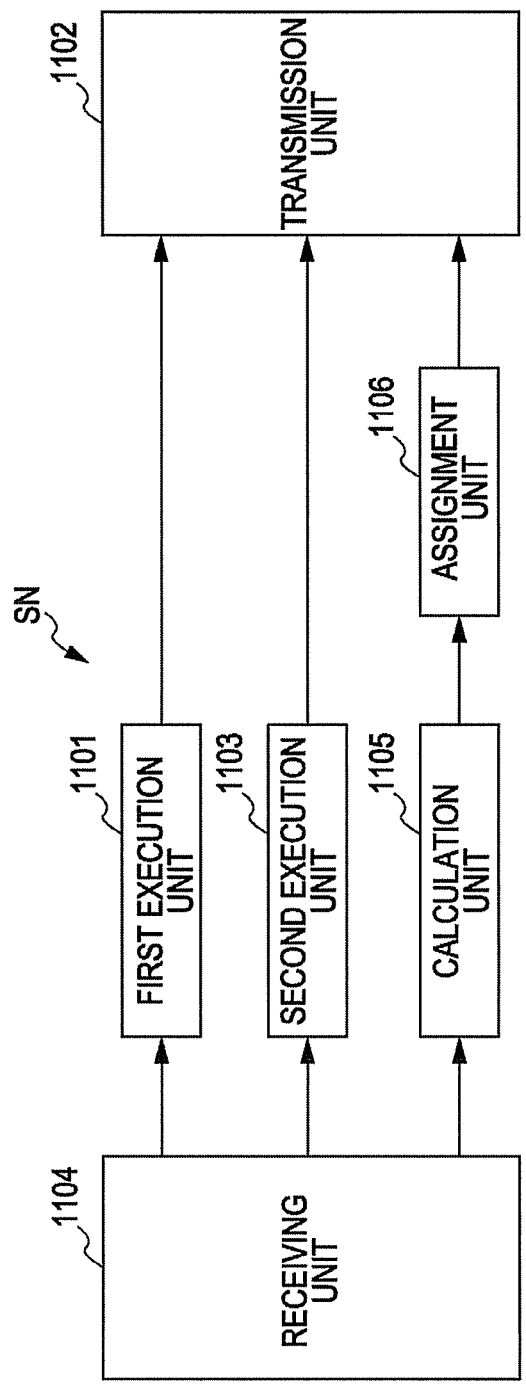
FIG. 11 illustrates a normal node.

A normal node SN (for example, the nodes N2, N3 in the group G1) is disclosed. FIG. 11 is a block diagram illustrating the functional configuration of the normal node. In FIG. 11, the normal node SN includes a first execution unit 1101, a second execution unit 1103, a transmission unit 1102, a receiving unit 1104, a calculation unit 1105 and an assignment unit 1106. The function of a control unit for these component parts (the units 1101 to 1106) is implemented specifically through the I/F 304 or by causing the CPU 301 to execute the programs stored in the storage unit such as the ROM 302, the RAM 303, the magnetic disk and the optical disk illustrated in FIG. 3.

The first execution unit 1101 may perform carrying out the real time communication. As a specific example, the first execution unit 1101 sets the system node of the node N to the destination address by controlling the transmission unit 1102 and thus transmits the data on the real time communication (hereinafter referred to as "the real time data").

The real time data is the one required to have the real time property such as the data for feedback control. The first execution unit 1101 executes the real time communication periodically at preset time intervals. The period starting time of the real time communication, however, is the time point at which the sync packet is received from the relay node JN in the same group.

The second execution unit 1103 may perform carrying out the non-real time communication. As a specific example, the second execution unit 1103 sets the group node address of the node N to the destination address by controlling the transmission unit 1102 and thus transmits the non-real time data. The non-real time data, if addressed to the node N in a different group, however, is transmitted to the particular node N through the relay node JN in the same group as the local node N.

In the following description of a specific example of each function, the node N2 in the network system 200 is assumed to be the normal node SN.

The receiving unit 1104 may perform receiving the real time data and the non-real time data. The receiving unit 1104 receives the real time data or the non-real time data through the switching device SW1.

The calculation unit 1105 may perform calculating the data flow rate assigned to the path connecting the local node and other nodes in the first node group based on the flow rate of the non-real time data received. The path connecting the local node and other nodes is a physical link PL connecting the nodes N1, N3 with the node N2 through the switching device SW1.

Incidentally, the calculation process of the calculation unit 1105 is similar to that of the calculation unit 506 of the relay node JN described above, and therefore, is not disclosed again.

The assignment unit 1106 may perform assigning the calculated data flow rate to the path connecting the local node and other nodes. The assignment unit 1106 holds, in the form related to each other, the physical link PL connecting the local node and other nodes and the data flow rate assigned to the physical link PL.

The transmission unit 1102 may perform transmitting the assignment result to other nodes. The transmission unit 1102 specifies the system node address of other nodes with reference to the address table 402. The transmission unit 1102 then, using the system node address thus specified, transmits the data flow rate assigned to the physical link PL set between the local node and other nodes.

The receiving unit 1104 may perform receiving, from other nodes, the result of assignment to the path leading from the local node to other nodes. The second execution unit 1103 executes the non-real time data in accordance with the assignment result received. The second execution unit 1103 transmits the non-real time data to other nodes in such a manner as not to exceed the data flow rate assigned to the physical link VL by controlling the transmission unit 1102.

The operations of the communication process executed by the relay node JN are disclosed. In all the nodes in the network system 200, the relay nodes JN other than the local node are designated as "the relay node JNi" (i=1, 2, ... n). The normal nodes SN in the same group as the local node are each expressed as "the normal node SNj (j=1, 2, ..., m)". Further, assume that the virtual links VL1 to VLn connecting the local node and the relay nodes JN1 to JNn are set in advance.

Figure 12:
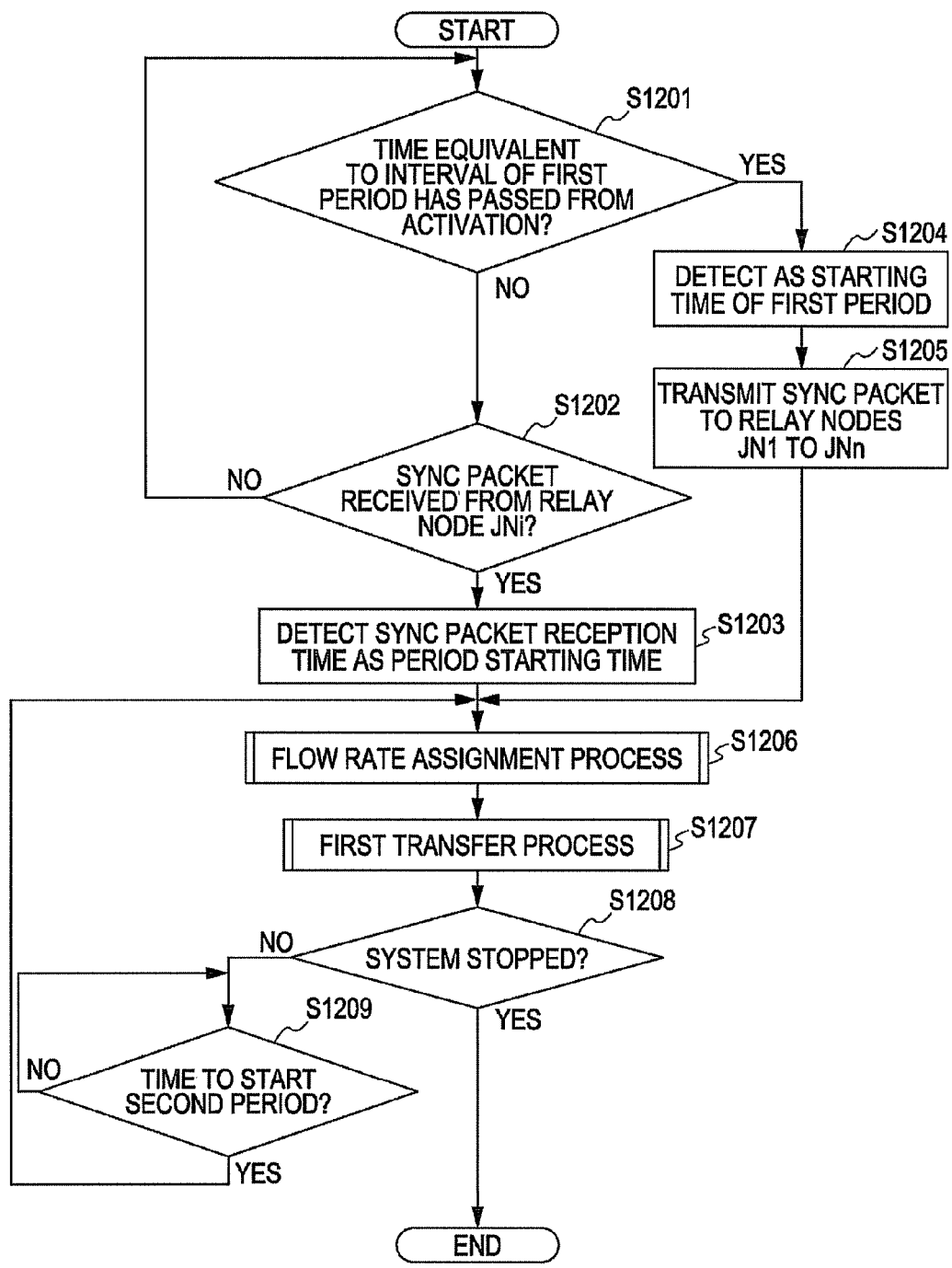
FIG. 12 illustrates an example of the communication processing operations of the relay node.

FIG. 12 illustrates an example of the operations of the communication process executed by the relay node. In the flowchart of FIG. 12, the first operation is for the detection unit 505 to judge whether the time equal to the interval of the first period has passed or not from the set-up of the network system 200 (operation S1201).

In the case where the time equal to the time interval of the first period has not so passed (NO in operation S1201), the receiving unit 502 judges whether the sync packet is received or not from the relay node JNi (operation S1202). In the case where no sync packet is received (NO in operation S1202), the process returns to operation S1201.

In the case where the sync packet is received (YES in operation S1202), on the other hand, the detection unit 505 detects the time of reception of the sync packet as the starting time of the first period (operation S1203). Then, the flow rate assignment process is executed to assign the data flow rate to the virtual link VLi connecting the local node and the relay node JNi (operation S1206).

After that, the first transfer process is executed in which the non-real time data is transferred to the relay node JNi using the virtual link VLi (operation S1207). Next, it is judged whether a command is issued to stop the network system 200 (operation S1208).

In the absence of the stop command (NO in operation S1208), the process waits until the starting time of the second period (NO in operation S1209). With the arrival of the starting time of the second period (YES in operation S1209), the process returns to operation S1206.

In the case where the time equal to the time interval of the first period has passed in operation S1201 (YES in operation S1201), on the other hand, the detection unit 505 detects, as the starting time point of the first period, the time point at which the time equal to the time interval of the first period has passed (operation S1204). Then, the transmission unit 508 transmits the sync packet to the relay nodes JN1 to JNn (operation S1205) and the process is passed to operation S1206.

In the presence of the command to stop the network system 200 in operation S1208 (YES in operation S1208), a series of the processes illustrated in the flowchart are finished. Incidentally, the command to stop the network system 200 may be accepted at an arbitrary timing.

Figure 13:
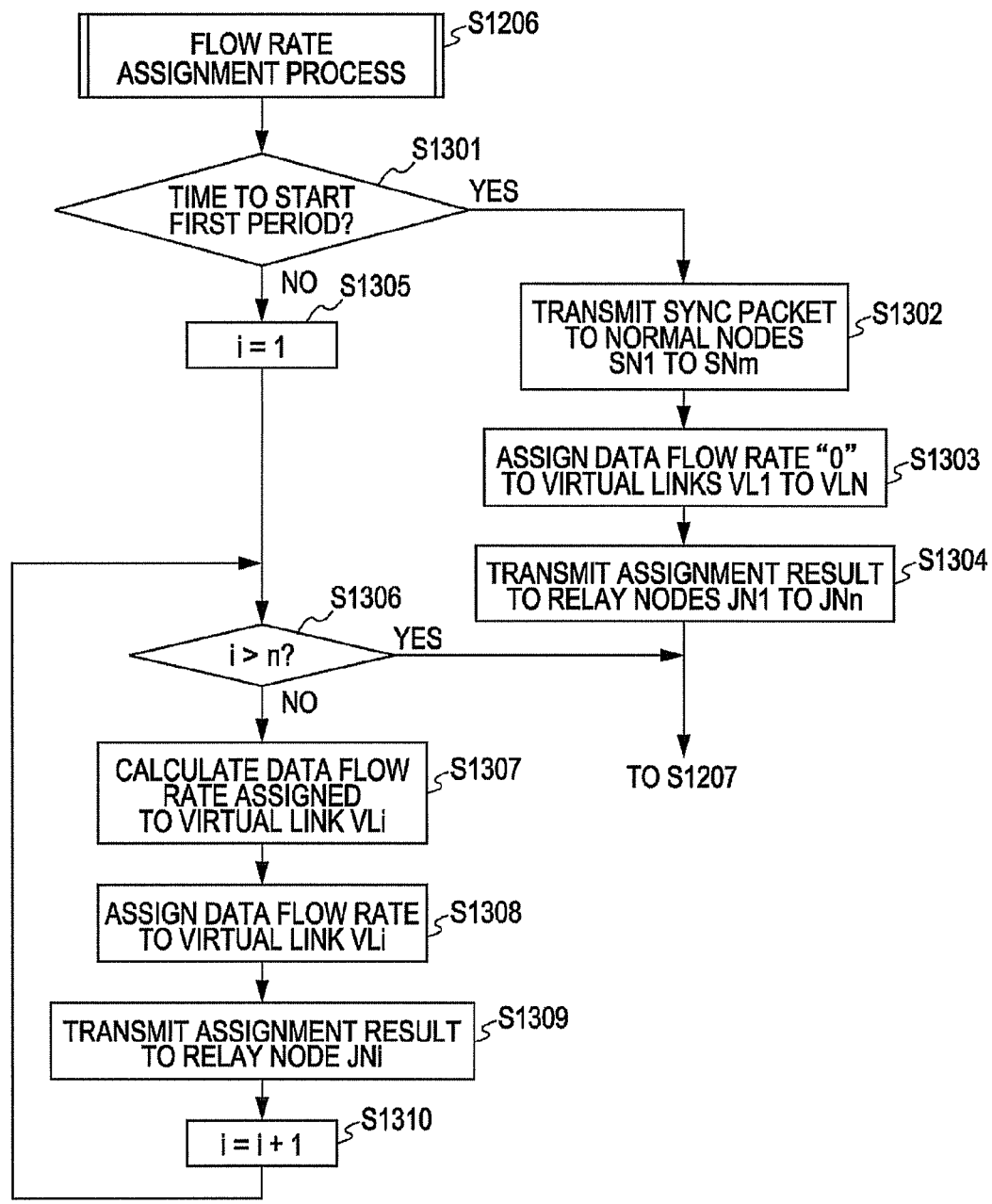
FIG. 13 illustrates an exemplary flow rate assignment process of operation S1206.

The specific flow rate assignment process in operation S1206 illustrated in FIG. 12 is disclosed. FIG. 13 illustrates a specific example of the flow rate assignment process of operation S1206.

As the first operation in the flowchart of FIG. 13, operation it is judged whether the present time is the starting time point of the first period or not (operation S1301). In the case where the present time is the starting time point of the first period (YES in operation S1301), the transmission unit 508 transmits the sync packet to the normal nodes SN1 to SNm (operation S1302).

After that, the assignment unit 507 assigns the data flow rate "0" to the virtual links VL1 to VLn connecting the local node and the relay nodes JN1 to JNn (operation S1303). Then, the transmission unit 508 transmits the assignment result to the relay nodes JN1 to JNn (operation S1304), after which the process is transferred to operation S1207 illustrated in FIG. 12.

In the case where the present time is not the starting time point of the first period in operation S1301 (NO in operation S1301), on the other hand, i is set to 1 (operation S1305) to judge whether i>n or not (operation S1306). In the case where i≤n (NO in operation S1306), the calculation unit 506 calculates the data flow rate assigned to the virtual link VLi (operation S1307).

The assignment unit 507 assigns the calculated data flow rate to the virtual link VLi (operation S1308), and the transmission unit 508 transmits the assignment result to the relay node JNi (operation S309). After that, i is set to i+1 (operation S1310), and the process returns to operation S1306.

In the case where i>n in operation S1306 (YES in operation S1306), on the other hand, the process proceeds to operation S1207 illustrated in FIG. 12.

In this way, the execution time of the real time communication and the non-real time communication may be distinguished from each other, thereby making it possible to avoid the conflict between the real time communication and the non-real time communication.

Figure 14:
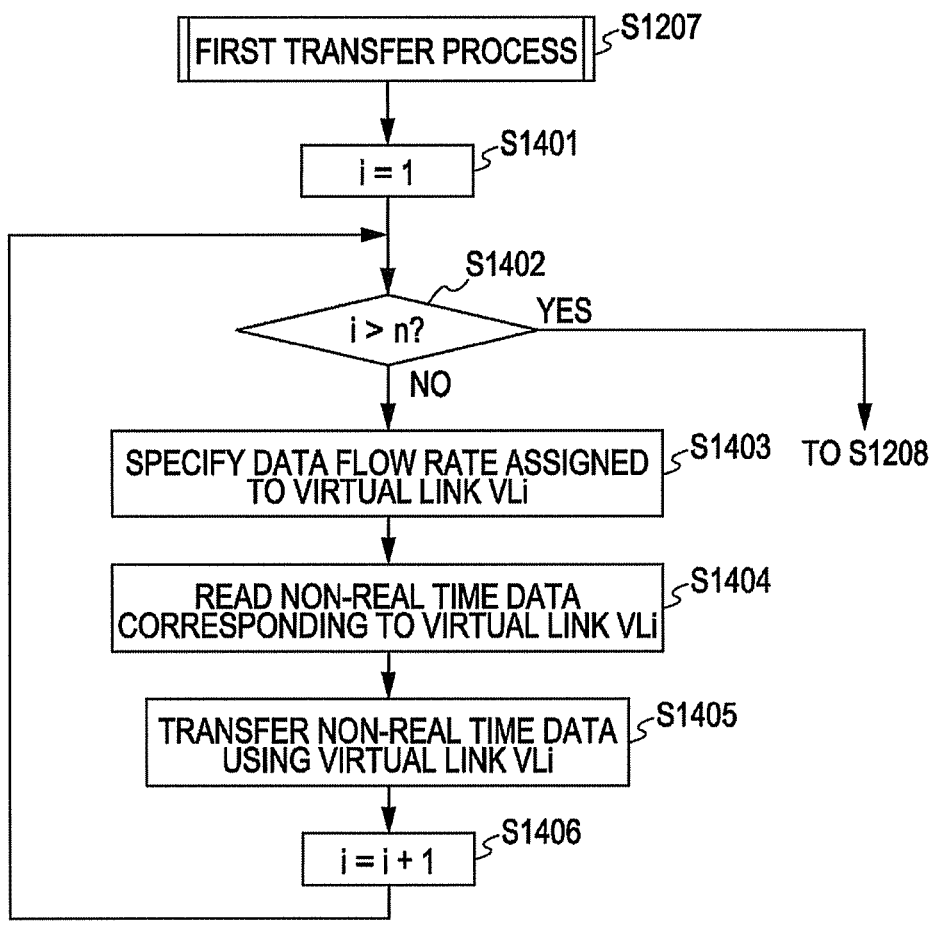
FIG. 14 illustrates an exemplary first transfer process of operation S1207.

A first transfer process in operation S1207 illustrated in FIG. 12 is disclosed. FIG. 14 illustrates an example of the first transfer process in operation S1207.

In FIG. 14, the first operation is to set i to 1 (operation S1401) thereby to judge whether i>n or not (operation S1402). In the case where i≤n (NO in operation S1402), the transfer unit 504 specifies the data flow rate assigned to the virtual link VLi, with reference to the assignment table 1000 (operation S1403).

The transfer unit 504 reads the non-real time data corresponding to the virtual link VLi from the storage device with reference to the correspondence table 700 (operation S1404). In accordance with the data flow rate specified in operation S1403, the transfer unit 504 transfers the non-real time data that has been read, using the virtual link VLi (operation S1405).

After that, i is set to i+1 (operation S1406), and the process returns to operation S1402. In the case where i becomes larger than n (YES in operation S1402), the process proceeds to operation S1208 illustrated in FIG. 12.

The data flow rate of the non-real time communication can be controlled in accordance with the actual communication situation or the capacity of the physical link of the network 210.

Figure 15:
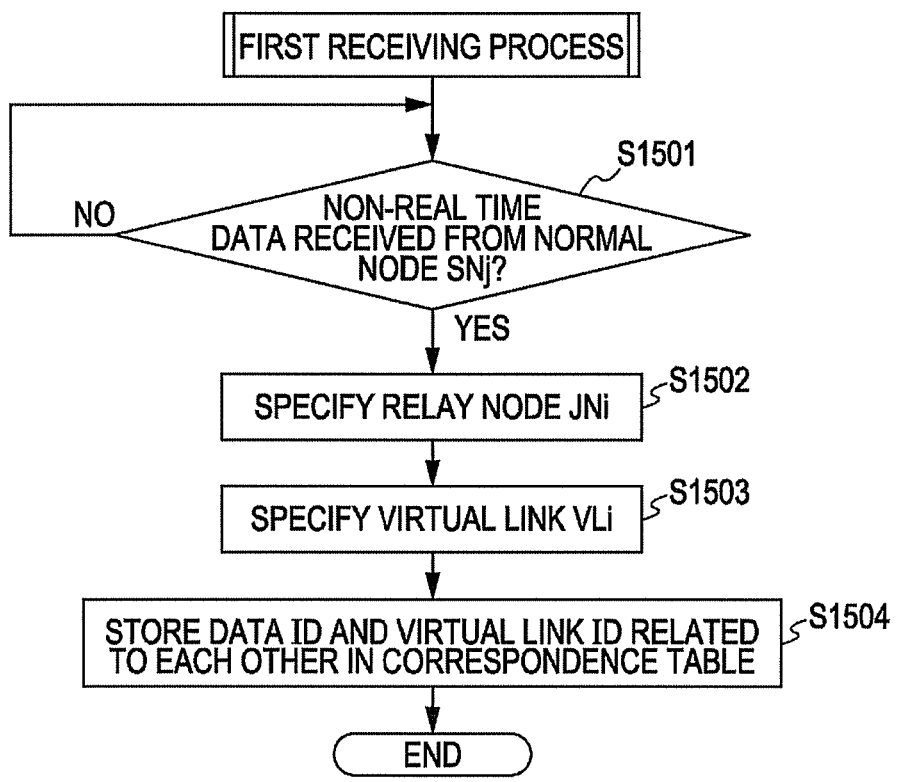
FIG. 15 illustrates an example of operations of a first receiving process of the relay node.

Next, the processing operations of the first receiving process for receiving the non-real time data from the normal node SNj in the same group are disclosed. FIG. 15 illustrates an example of the operations of the first receiving process of the relay node. In the flowchart of FIG. 15, the first operation is to judge whether the receiving unit 502 has received the non-real time data from the normal node SNj or not (operation S1501).

Assuming that after waiting for the reception of the non-real time data (NO in operation S1501), the non-real time data is received (YES in operation S1501). The relating unit 503 specifies the relay node JNi of the same group as the node N at the destination address set in the non-real time data received (operation S1502).

After that, the relating unit 503 specifies the virtual link VLi connecting the local node and the specified relay node JNi (operation S1503). Finally, the relating unit 503 relates the data ID of the non-real time data and the virtual link ID of the virtual link VLi to each other and stores the relation in the correspondence table 700 (operation S1504), thus finishing the series of the processes in this flowchart.

The virtual link VLi used for transfer of the non-real time data can be specified from among a plurality of the virtual links VL1 to VLn.

Figure 16:
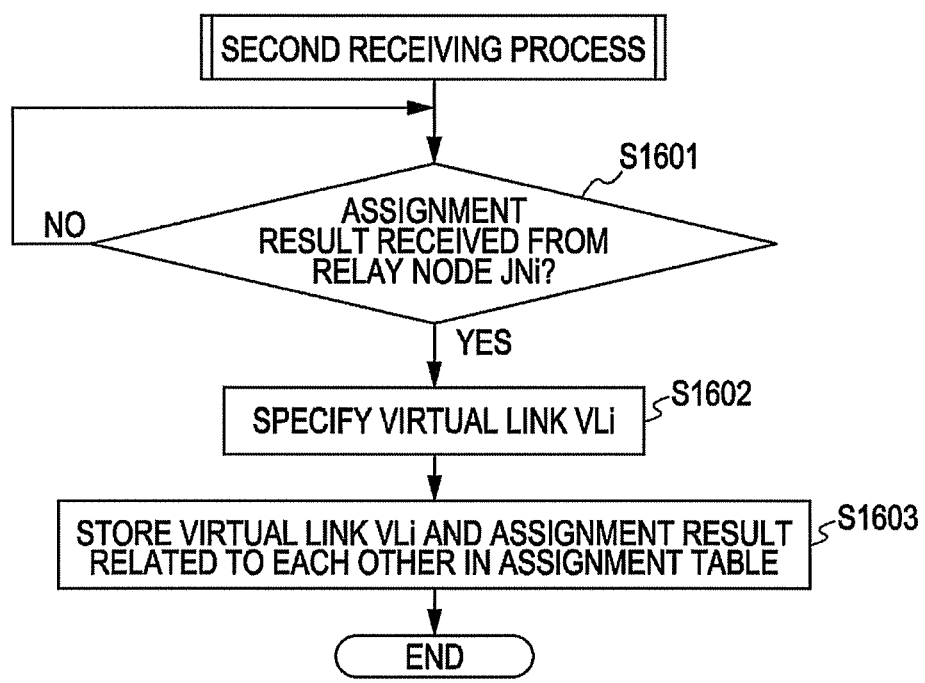
FIG. 16 illustrates an example of operations of a second receiving process of the relay node.

Next, the processing operations of the second receiving process for receiving the result of assignment to the virtual link VLi connecting the local node and the relay node JNi are disclosed. FIG. 16 illustrates an example of the processing operations of the second receiving process of the relay node. In the flowchart of FIG. 16, the first operation is to judge whether the receiving unit 502 has received the assignment result from the relay node JNi or not (operation S1601).

Assuming that after waiting for the reception of the assignment result (NO in operation S1601), the non-real time data is received (YES in operation S1601). The relating unit 503 specifies the virtual link VLi connecting the local node and the relay node JNi (operation S1602). Finally, the relating unit 503 relates the specified virtual link VLi and the received assignment result to each other and stores the relation in the assignment table 1000 (operation S1603), thereby finishing the series of the processes according to this flowchart.

The data flow rate of the non-real time data assigned to each of the virtual links VL1 to VLn can be specified.

Figure 17:
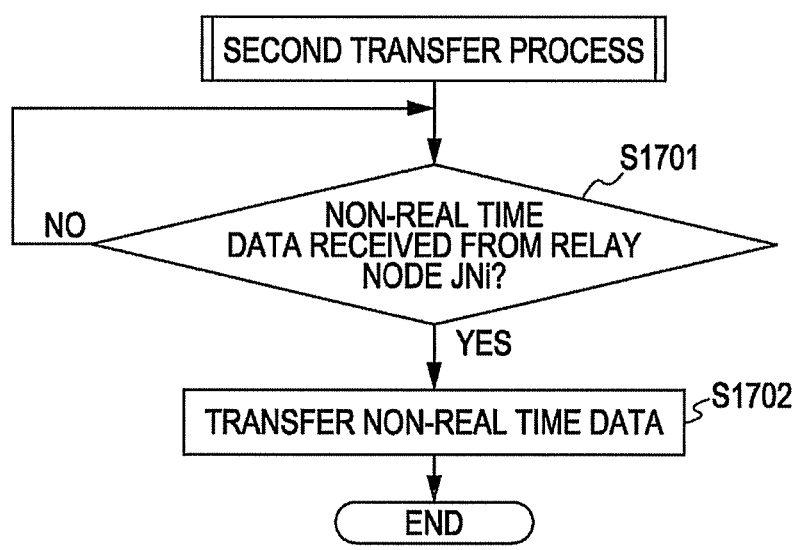
FIG. 17 illustrates an example of operations of a second transfer process of the relay node.

The processing operations of the second transfer process for transferring the non-real time data from the relay node JNi to the normal node SNj are disclosed. FIG. 17 illustrates an example of the processing operations of the second transfer process of the relay node.

In FIG. 17, the first operation is to judge whether the receiving unit 502 has received the non-real time data from the relay node JNi or not (operation S1701). Assuming that after waiting for the reception of the non-real time data (NO in operation S1701), the non-real time data is received (YES in operation S1701). The transfer unit 504 transfers the received non-real time data to the group node address set in the particular non-real time data (operation S1702).

The non-real time data can be transferred between different groups through the relay node JN.

Figure 18:
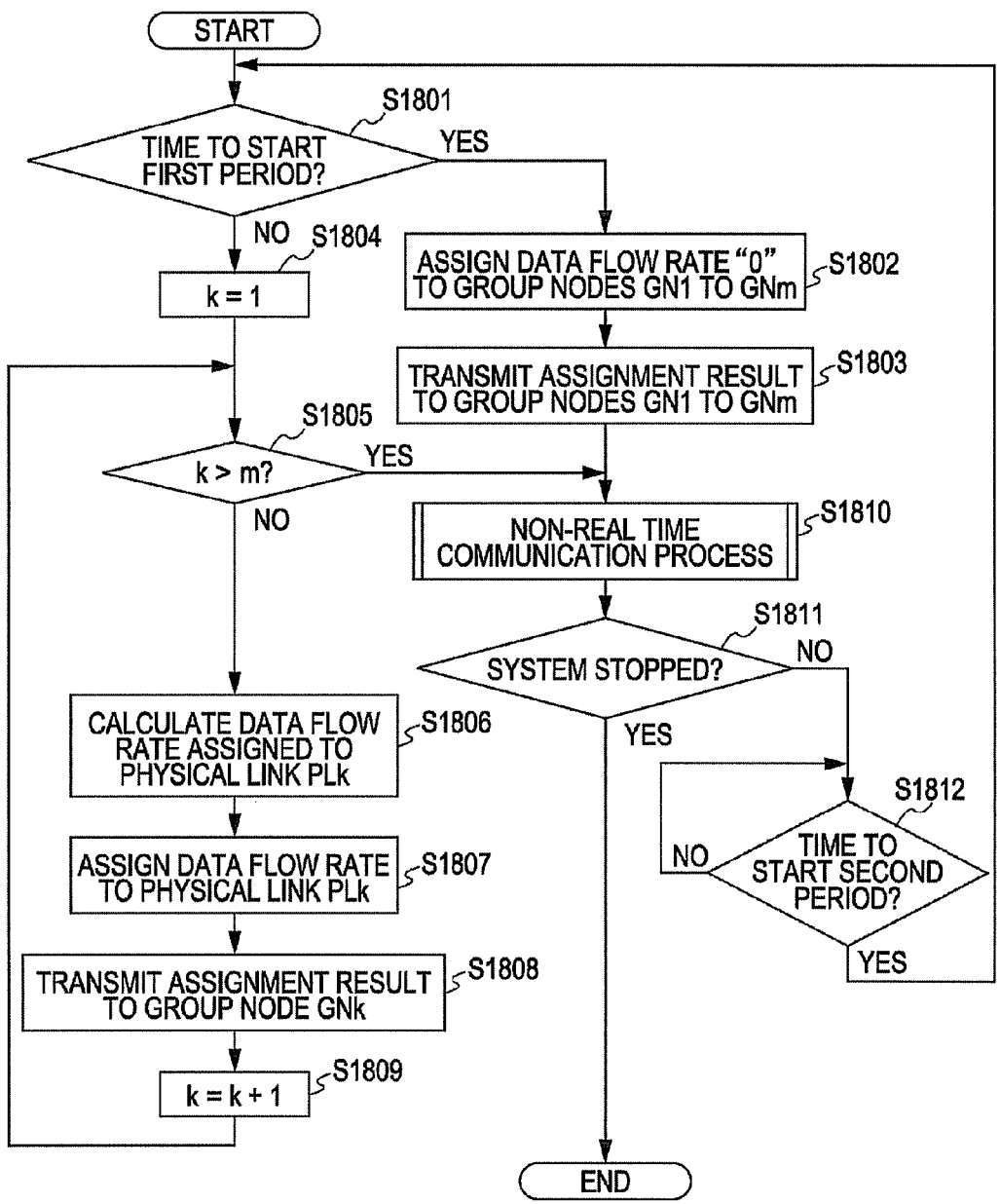
FIG. 18 illustrates an example of a communication process of the normal node.

The operations of the communication process of the normal node SN are disclosed. The nodes N other than the local node in the same group are each designated as "the group node GNk (k=1, 2, . . . , m)". FIG. 18 illustrates an example of the communication processing operations for the normal node. In the flowchart of FIG. 18, the first operation is to judge whether the present time is the starting time point of the first period or not (operation S1801).

In the case where the present time is the starting time point of the first period (YES in operation S1801), the assignment unit 1106 assigns the data flow rate "0" to the physical links VL1 to VLm connecting the local node and the group nodes GN1 to GNm (operation S1802). Then, the transmission unit 1102 transmits the assignment result to the group nodes GN1 to GNm (operation S1803), after which the process proceeds to operation S1810.

In the case where operation S1801 judges that the present time is not the starting time point of the first period (NO in operation S1801), on the other hand, k is set to 1 (operation S1804) to judge whether k>m or not (operation S1805). In the case where k≤m (NO in operation S1805), the calculation unit 1105 calculates the data flow rate assigned to the physical link PLk (operation S1806).

Then, the assignment unit 1106 assigns the calculated data flow rate to the physical link PLk (operation S1807). The transmission unit 1102 transmits the assignment result to the group node GNk (operation S1808). After that, k is set to k+1 (operation S1809), and the process returns to operation S1805.

In the case where operation S1805 judges that k>m (YES in operation S1805), on the other hand, the second execution unit 1103 executes the non-real time communication process (operation S1810). Then, it is judged whether a command to stop the network system 200 is issued or not (operation S1811).

In the case where no such stop command is issued (NO in operation S1811), the process waits for the starting time point of the second period (NO in operation S1812). With the arrival of the starting time point of the second period (YES in operation S1812), the process returns to operation S1801. In the case where the command to stop the network system 200 is issued in operation S1811 (YES in operation S1811), on the other hand, the series of the processes in this flowchart are finished.

The execution periods of the real time communication and the non-real time communication are distinguished from each other, thereby making it possible to avoid the conflict between the real time communication and the non-real time communication.

Figure 19:
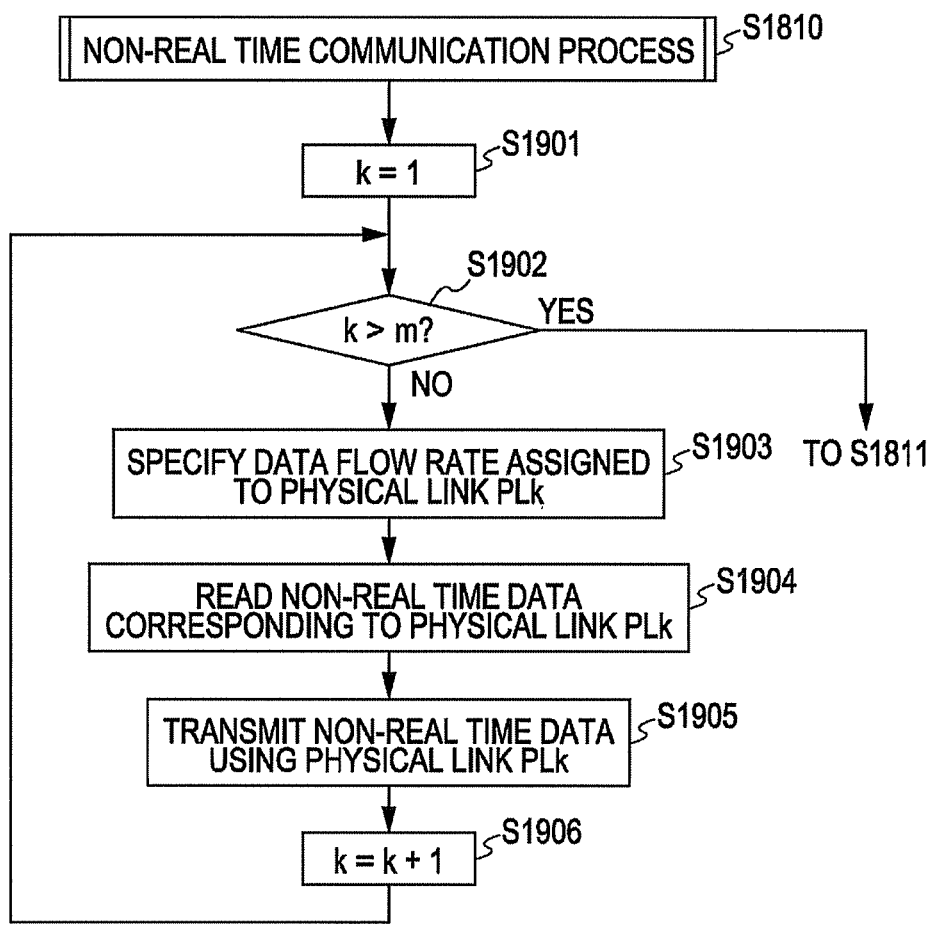
FIG. 19 illustrates an exemplary non-real time communication process of operation S1810.

The non-real time communication process of operation S1810 illustrated in FIG. 18 is specifically disclosed. FIG. 19 is a flowchart specifically showing an example of the non-real time communication process of operation S1810.

In the flowchart of FIG. 19, the first operation is to set k to 1 (operation S1901) and judge whether k>m or not (operation S1902). In the case where k≤m (NO in operation S1902), the second execution unit 1103 specifies the data flow rate assigned to the physical link PLk (operation S1903).

Next, the second execution unit 1103 reads the non-real time data corresponding to the physical link PLk from the storage device (operation S1904). Then, the second execution unit 1103 controls the transmission unit 1102 so that the non-real time data thus read is transmitted using the physical link PLk in accordance with the data flow rate specified in operation S1903 (operation S1905).

After that k is set to k+1 (operation S1906), and the process returns to operation S1902. Once k becomes larger than m (YES in operation S1902), the process proceeds to operation S1811 illustrated in FIG. 18.

In this way, the data flow rate of the non-real time communication can be controlled in accordance with the actual communication situation and the capacity of the physical link of the network 210.

Figure 20:
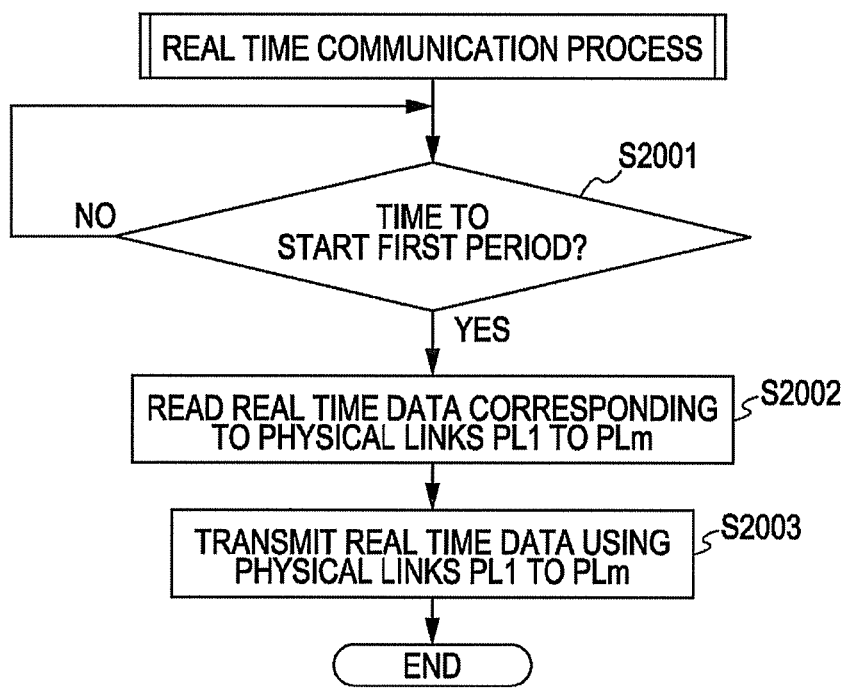
FIG. 20 illustrates a real time communication process of the normal node.

Next, the processing operations of the real time communication of the normal node SN are disclosed. FIG. 20 illustrates an example of the processing operations of the real time communication of the normal node. In the flowchart of FIG. 20, the first operation is to judge whether the present time is the starting time point of the first period (operation S2001).

Assuming that the process waits until the present time becomes the starting time of the first period (NO in operation S2001) and the starting time of the first period has arrived (YES in operation S2001). The first execution unit 1101 reads the real time data corresponding to the physical links PL1 to PLm from the storage device (operation S2002). Then, the second execution unit 1103 controls the transmission unit 1102 so that the real time data that has been read is transmitted using the physical links PL1 to PLm (operation S2003).

Although the real time data and the non-real time data may distinguish from each other according to the a difference in destination address in this specification, the embodiments are not so limited. Alternatively, example, the header information indicating the real time data or the non-real time data may be attached.

As disclosed above, the non-real time data can be transferred between groups using the virtual link VL connecting the relay nodes JN selected from each group. The non-real time data of the groups can be collected to reduce the conflict with the real time communication.

Also, the non-real time data can be transferred between the groups at the time different from the starting time of the real time communication periodically executed in the network 210. The execution periods of the real time communication and the non-real time communication can be distinguished from each other to avoid the conflict between the real time communication and the non-real time communication.

Further, the network system 200 can be constructed using a plurality of switching devices, and therefore, the system configuration is improved in flexibility and extendibility.

Furthermore, the data flow rate assigned to the virtual link VL can be calculated based on the transmission capacity of the network 210. The data flow rate of the non-real time communication can be controlled in accordance with the capacity of the physical link of the network 210.

Also, the data flow rate assigned to the virtual link VL can be calculated in accordance with the non-real time data transferred from the relay nodes JN of other groups. The data flow rate of the non-real time communication can be controlled in accordance with the actual communication situation between the groups.

The real time communication can be carried out using the destination address of the node N determined uniquely for the network system 200 as a whole. Also, the non-real time communication can be carried out using the destination address of the node N uniquely determined for each group. The real time data and the non-real time data can be discriminated from each other in the network system 200.

The communication method may be accompanied by the topological restriction that the switching devices not directly connected to the relay node JN cannot be connected adjacently to each other. In the case of the switching devices connecting the switching devices such as a core switch or a router switch, the switching devices not directly connected to the relay node JN would be connected adjacently to each other. In such a case, like in the prior art, the problem of data conflict is posed between the switching devices not directly connected to the relay node JN.

In view of this, the relay node JN is provided for the switching device connecting the switching devices. The relay node JN is provided for a switching device connecting a switching device directly connected to the relay node JN and a switching device not directly connected to the relay node JN.

Figure 21:
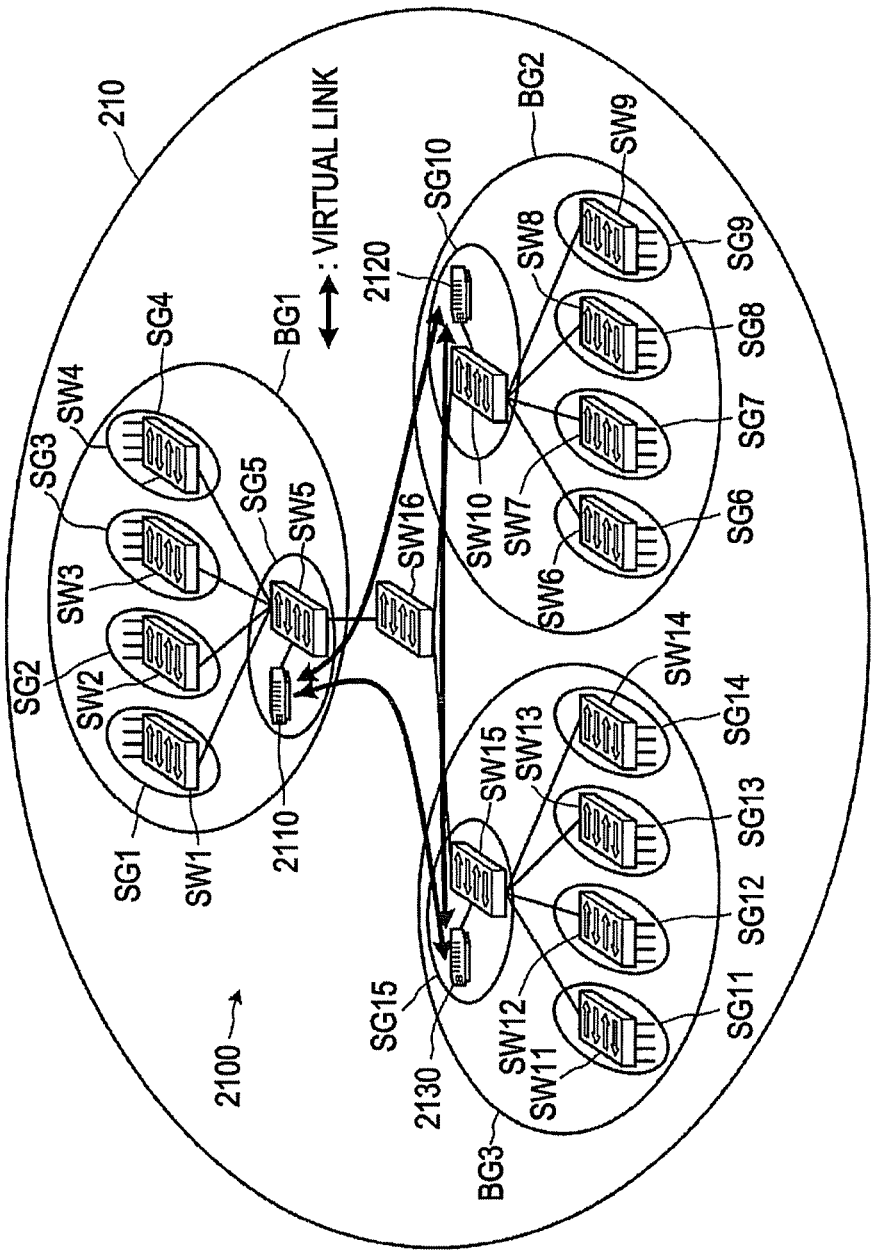
FIG. 21 illustrates network system according to an embodiment.

FIG. 21 illustrates a network system according to an embodiment. In a network system 2100, small groups SG1 to SG15 each formed of a node group (not illustrated) directly connected with the individual switching devices SW1 to SW16 are communicably connected through the network 210.

A large group BG1 is formed of small groups SG1 to SG5, a large group BG2 is formed of small groups SG6 to SG10, and a large group BG3 is formed of small groups SG11 to SG15. The switching devices SW5, SW10, SW15 are core switches connecting the switching devices to each other. Relay nodes 2110, 2120 and 2130 are provided for the switching devices SW5, SW10 and SW15, respectively.

In the network system 2100, the non-real time communication exceeding the large groups BG1 to BG3 once transmit the non-real time data to the relay nodes of a large group (for example, the relay nodes 2110, 2120, 2130) as a communication between small groups. Also, in the communication between large groups, the communication processing operations similar to those for the communication between the relay nodes of the small groups may be executed. In this way, the non-real time communication can be conducted without interference with the real time communication.

An exemplary embodiment is applicable to a large system by preventing the switching devices having no directly connected relay node from being adjacently connected to each other.

The communication method disclosed can be implemented by executing a prepared program on the computer such as a personal computer or a work station. This communication program is stored in a non-transitory computer-readable recording medium such as a hard disk, a flexible disk, a CD-ROM, an MO or a DVD, and executed by being read from the recording medium by the computer. Also, this communication program may be distributed through a network such as the internet.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The invention claimed is:

1. A non-transitory recording medium having recorded therein a communication program causing non-real time communication to be executed by first and second node groups in a network for conducting real time communication between the nodes, the communication program causing at least one computer to execute a method comprising:
   causing a local node selected from the first node group to set a path leading from the local node to another node selected from the second node group;
   causing the local node to receive non-real time data on the non-real time communication from other nodes of the first node group than the local node to the second node group; and
   transferring, from the local node to the other node through a communication path between a first relay device coupled to the first node group and a second relay device coupled to the second node group, the non-real time data received from the other nodes, using the path,
   wherein real time data on the real time communication from the other nodes of the first node group is transferred to the second node group with the non-real time data using the communication path and without passing through the local node, and
   the local node is caused to control an amount of the non-real time data on the non-real time communication transferred through the communication path, so as to reduce conflict with the real time data on the real time communication on the communication path.

2. The recording medium according to claim 1, wherein the communication program causes the computer of the local node to further execute:
   detecting a period starting time point of the real time communication executed periodically in the network; and transferring from the local node to the other node, the data on the non-real time communication at a time point different from the period starting time point of the real time communication detected by the detecting.

3. The recording medium according to claim 1, wherein the communication program stored in the recording medium causes the computer of the local node to further execute:
- causing the local node to calculate data flow rate assigned to the set path based on transmission capacity of the network;
- causing the local node to perform assignment of the data flow rate calculated to the path; and
- causing the local node to transmit a result of the assignment to the other node.

4. The recording medium according to claim 3, wherein the data flow rate assigned to the set path is calculated based on the data flow rate of the non-real time data transferred from the other node to the local node.

5. The recording medium according to claim 1, wherein the communication program stored in the recording medium causes the computer of the local node to further execute:
- causing the local node to receive, from the other node, the data on the non-real time communication from the other nodes of the second node group than the other node to the other nodes of the first node group than the local node; and
- causing the local node to transfer the data received to the other nodes of the first node group than the local node.

6. The recording medium according to claim 1, wherein the communication program stored in the recording medium causes the computer of the local node to further execute a process in which:
- an address for uniquely specifying the node included in the network is set in the data on the real time communication, and an address for uniquely specifying the node included in each node group is set in the data on the non-real time communication.

7. A communication method for causing non-real time communication to be carried out by nodes in a network for conducting real time communication between the nodes, comprising:
- setting a path leading from a local node selected from the first node group to another node selected from the second node group;
- receiving non-real time data on the non-real time communication from the other nodes of the first node group than the local node to the second node group;
- transferring the non-real time data received from the other nodes to the other node through the path set, through a communication path between a first relay device coupled to a first node group and a second relay device coupled to a second node group;
- transferring, by the local node, real time data on the real time communication from the other nodes of the first node group to the second node group with the non-real time data using the communication path and without passing through the local node, and
- controlling by the local node an amount of the non-real time data transferred through the communication path, so as to reduce conflict with the real time data on the real time communication on the communication path.

* * * * *

UNITED STATES PATENT AND TRADEMARK OFFICE
CERTIFICATE OF CORRECTION

PATENT NO.         : 9,049,048 B2
APPLICATION NO.    : 12/723751
DATED              : June 2, 2015
INVENTOR(S)        : Kazuki Hyoudou Page 1 of 1

It is certified that error appears in the above-identified patent and that said Letters Patent is hereby corrected as shown below:

In the claims

Claim 7, Column 18, Line 17 (Approximately)

Delete "transferring" and insert --transferring, by the local node,--, therefor.

Claim 7, Column 18, Line 22 (Approximately)

Delete "transferring, by the local node," and insert --transferring--, therefor.

Signed and Sealed this
Twenty-seventh Day of October, 2015

Michelle K. Lee
*Director of the United States Patent and Trademark Office*